United States Patent
Ohsaka et al.

(10) Patent No.: US 12,400,250 B2
(45) Date of Patent: Aug. 26, 2025

(54) INFORMATION PROCESSING DEVICE, CONTROL METHOD, AND STORAGE MEDIUM

(71) Applicant: NEC Corporation, Tokyo (JP)

(72) Inventors: Naoto Ohsaka, Tokyo (JP); Tatsuya Matsuoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 217 days.

(21) Appl. No.: 18/275,153

(22) PCT Filed: Feb. 4, 2021

(86) PCT No.: PCT/JP2021/004115
§ 371 (c)(1),
(2) Date: Jul. 31, 2023

(87) PCT Pub. No.: WO2022/168234
PCT Pub. Date: Aug. 11, 2022

(65) Prior Publication Data
US 2024/0086985 A1    Mar. 14, 2024

(51) Int. Cl.
*G06Q 30/00* (2023.01)
*G06Q 30/0601* (2023.01)

(52) U.S. Cl.
CPC ............... *G06Q 30/0619* (2013.01)

(58) Field of Classification Search
None
See application file for complete search history.

(56) References Cited

U.S. PATENT DOCUMENTS

2003/0158824 A1   8/2003   Aisu
2019/0034947 A1*  1/2019   Rucker ............. G06Q 30/0205

FOREIGN PATENT DOCUMENTS

| JP | 2002-099770 A  | 4/2002 |
| WO | 2002/027575 A1 | 4/2002 |
| WO | 2021/001977 A1 | 1/2021 |

OTHER PUBLICATIONS

International Search Report for PCT Application No. PCT/JP2021/004115, mailed on May 11, 2021.

* cited by examiner

*Primary Examiner* — Mila Airapetian
(74) *Attorney, Agent, or Firm* — Sughrue Mion, PLLC

(57) ABSTRACT

The information processing device 1X mainly includes an acquisition means 16Xa and a transition sequence determination means 16Xb. The acquisition means 16Xa acquires a first combination between sellers and buyers conducting transactions and a second combination between the sellers and the buyers differing from the first combination. The transition sequence determination means 16Xb determines a transition sequence of combinations between the sellers and the buyers, the transition sequence being generated in a process of making a transition, per basic operation for changing the combinations between the sellers and the buyers, from the first combination to the second combination, each combination of the transition sequence making a profit of a mediator equal to or larger than a threshold value, the mediator mediating the transactions.

10 Claims, 21 Drawing Sheets

SELLER INFORMATION

CREATION DATE & TIME INFORMATION

SELLER IDENTIFICATION INFORMATION

DELIVERY LOCATION INFORMATION

PRICE INFORMATION

DELIVERY PERIOD INFORMATION

TRADING VOLUME INFORMATION

VESSEL INFORMATION

VESSEL NAME INFORMATION

LOAD CAPACITY INFORMATION

SPEED INFORMATION

FUEL EFFICIENCY INFORMATION

⋮

SOLUTION x, PROFIT = 12

SOLUTION y, PROFIT = 18

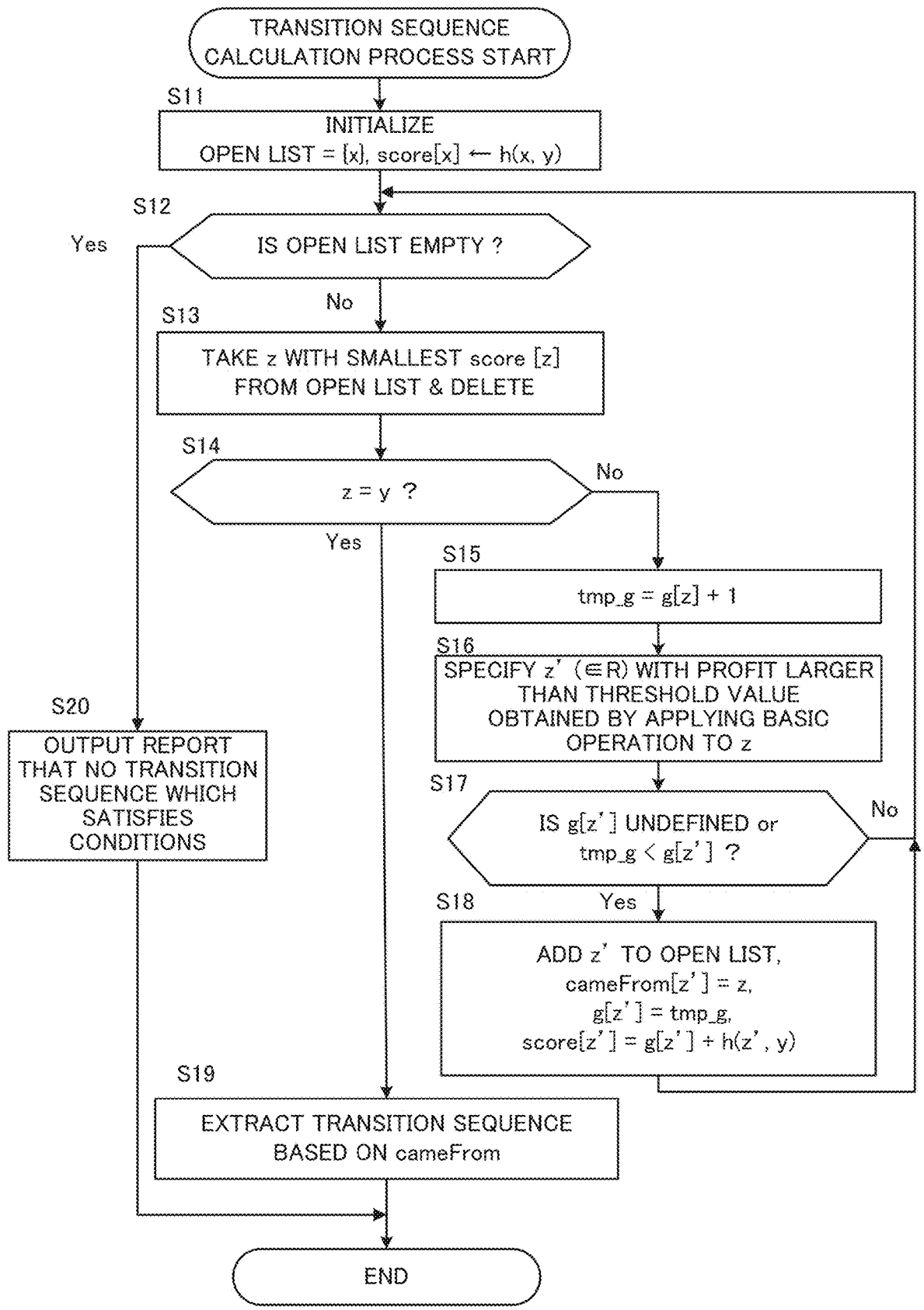

FIG. 14

USER INSTRUCTION VIEW

SELECT PLAN (INITIAL PLAN ⋯⋯ & TARGET PLAN ☐ )

| PLAN NAME | CREATE DAY & TIME | PROFIT | REVENUE | EXPENDITURE |
|---|---|---|---|---|
| FIRST PLAN | xxxx | xxxx | xxxx | ⋮ |
| SECOND PLAN | xxxx | xxxx | xxxx | ⋮ |
| THIRD PLAN | xxxx | xxxx | xxxx | ⋮ |
| FOURTH PLAN | xxxx | xxxx | xxxx | ⋮ |
| ⋮ | ⋮ | ⋮ | ⋮ | ⋮ |

66

SPECIFY PROFIT $\theta$ TO BE GUARANTEED

| ● | GUARANTEE PROFIT FOR INITIAL PLAN |
|---|---|
| ○ | SIMULATE BY MULTIPLE $\theta$ |
| ○ | SPECIFY $\theta$ ☐ |

67   670

START   69

TRANSITION SEQUENCE DISPLAY VIEW

| PLAN NAME | NUMBER OF BASIC OPERATIONS TO TARGET PLAN | PROFIT | REVENUE | EXPENDITURE | ... |
|---|---|---|---|---|---|
| FIRST PLAN | 5 | xxxx | xxxx | xxxx | ... |
| FIRST TRANSITION PLAN | 4 | xxxx | xxxx | xxxx | ... |
| SECOND TRANSITION PLAN | 3 | xxxx | xxxx | xxxx | ... |
| THIRD TRANSITION PLAN | 2 | xxxx | xxxx | xxxx | ... |
| FOURTH TRANSITION PLAN | 1 | xxxx | xxxx | xxxx | ... |
| FOURTH PLAN | 0 | xxxx | xxxx | xxxx | ... |

FIG. 16

MATCHING DETAIL VIEW

| SELLER INFORMATION | | | | | | | BUYER INFORMATION | | | | | | | DEAL MATCHING INFORMATION | | |
|---|---|---|---|---|---|---|---|---|---|---|---|---|---|---|---|---|
| SELLER ID | TRADING CONDITION | PRICE | START OF DELIVERY | END OF DELIVERY | LOWER LIMIT OF HEAT AMOUNT | UPPER LIMIT OF HEAT AMOUNT | ... | BUYER ID | TRADING CONDITION | PRICE | START OF DELIVERY | END OF DELIVERY | LOWER LIMIT OF HEAT AMOUNT | UPPER LIMIT OF HEAT AMOUNT | ... | PROFIT/ LOSS | VESSEL | NUMBER OF NAVIGATION DAYS | ... |
| S1 | PORT OF LOADING | 111 | 2020/ 9/12 | 2021/ 4/25 | 123 | 144 | ... | B21 | PORT OF DIS- CHARGE | 211 | 2020/ 10/2 | 2021/ 2/25 | 53 | 204 | ... | 31 | SH1 | 15 | ... |
| S2 | PORT OF LOADING | 107 | 2020/ 10/21 | 2021/ 5/2 | 33 | 344 | ... | B7 | PORT OF DIS- CHARGE | 187 | 2020/ 9/21 | 2021/ 1/25 | 73 | 649 | ... | 23 | SH3 | 25 | ... |
| S3 | PORT OF LOADING | 117 | 2020/ 11/3 | 2020/ 12/2 | 33 | 412 | ... | B11 | PORT OF DIS- CHARGE | 199 | 2020/ 9/12 | 2021/ 7/2 | 63 | 312 | ... | 9 | SH7 | 11 | ... |
| ... | ... | ... | ... | ... | ... | ... | ... | ... | ... | ... | ... | ... | ... | ... | ... | ... | ... | ... | ... |
| S18 | PORT OF LOADING | 116 | 2021/ 9/12 | 2022/ 3/23 | 53 | 312 | ... | B31 | PORT OF DIS- CHARGE | 209 | 2021/ 6/12 | 2022/ 7/2 | 63 | 392 | ... | 12 | SH6 | 21 | ... |
| S19 | PORT OF LOADING | 111 | 2021/ 10/12 | 2021/ 9/25 | 120 | 144 | ... | B6 | PORT OF DIS- CHARGE | 201 | 2021/ 7/2 | 2022/ 1/25 | 77 | 204 | ... | 51 | SH9 | 14 | ... |
| ... | ... | ... | ... | ... | ... | ... | ... | ... | ... | ... | ... | ... | ... | ... | ... | ... | ... | ... | ... |

71

TRANSACTION SEQUENCE:
FIRST TIME

TRANSACTION SEQUENCE:
SECOND TIME

FIRST TIME ENUMERATION

FINALLY-SELECTED
TRANSITION SEQUENCE

SECOND TIME ENUMERATION

THIRD TIME ENUMERATION

● USER SELECTION SOLUTION
---▶ HIDDEN TRANSITION SEQUENCE

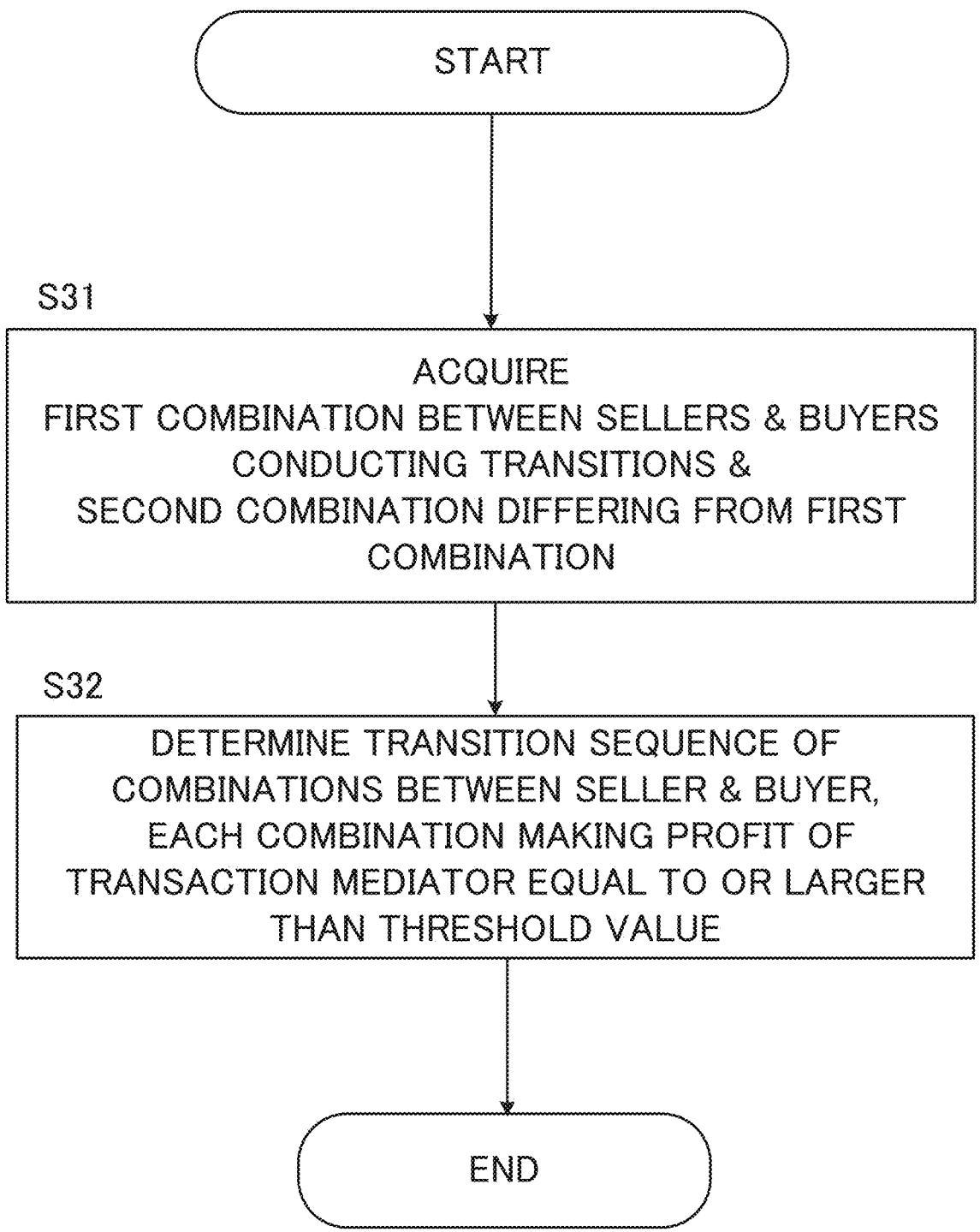

INFORMATION PROCESSING DEVICE, CONTROL METHOD, AND STORAGE MEDIUM

This application is a National Stage Entry of PCT/JP2021/004115 filed on Feb. 4, 2021, the contents of all of which are incorporated herein by reference, in their entirety.

TECHNICAL FIELD

The present invention relates to a technical field of an information processing device, a control method, and a storage medium for performing processing related to transactions.

BACKGROUND

There are known systems to support matching of sellers and buyer of goods. For example, Patent Literature 1 discloses an electronic transaction mediation system configured to generate a plurality of candidates of combinations of traders and customers to meet desired trading conditions of both the traders and the customers at the same time. Further, Patent Literature 2 discloses an optimization system capable of performing rematching by changing some terms of transaction after determining (matching) a combination between sellers and buyers to meet the terms of transaction desired by sellers and the buyer regarding goods to be traded, such as trading volume and transaction price.

CITATION LIST

Patent Literature

Patent Literature 1: WO2002/027575
Patent Literature 2: WO2021/001977

SUMMARY

Problem to be Solved

For matching between sellers and buyers of goods, it is necessary to conduct multiple negotiations with the sellers and buyers to formulate another plan better than the initial plan and to thereby make a transition from the initial plan to the other plan. On the other hand, such negotiations are not always successful, and in some cases, a negotiation on the way ends with a failure. In this case, it is generally not easy to nullify already-succeeded negotiations and get back to the initial plan. Thus, if the plan at the point where the negotiation is aborted is a plan that is not beneficial to the mediator, the mediator's profit will consequently decrease.

In view of the issues described above, one object of the present invention is to provide an information processing device, a control method, and a storage medium capable of suitably determine a transition of combinations between sellers and buyers of a transaction target while guaranteeing the profit of a mediator in changing the combinations.

Means for Solving the Problem

In one mode of the control device, there is provided an information processing device including:
an acquisition means configured to acquire a first combination between sellers and buyers conducting transactions and a second combination between the sellers and the buyers differing from the first combination; and
a transition sequence determination means configured to determine a transition sequence of combinations between the sellers and the buyers,
the transition sequence being generated in a process of making a transition, per basic operation for changing the combinations between the sellers and the buyers, from the first combination to the second combination,
each combination of the transition sequence making a profit of a mediator equal to or larger than a threshold value,
the mediator mediating the transactions.

In one mode of the control method, there is provided a control method executed by a computer, the control method including:
acquiring a first combination between sellers and buyers conducting transactions and a second combination between the sellers and the buyers differing from the first combination; and
determining a transition sequence of combinations between the sellers and the buyers,
the transition sequence being generated in a process of making a transition, per basic operation for changing the combinations between the sellers and the buyers, from the first combination to the second combination,
each combination of the transition sequence making a profit of a mediator equal to or larger than a threshold value,
the mediator mediating the transactions.

In one mode of the storage medium, there is provided a storage medium storing a program executed by a computer, the program causing the computer to:
acquire a first combination between sellers and buyers conducting transactions and a second combination between the sellers and the buyers differing from the first combination; and
determine a transition sequence of combinations between the sellers and the buyers,
the transition sequence being generated in a process of making a transition, per basic operation for changing the combinations between the sellers and the buyers, from the first combination to the second combination,
each combination of the transition sequence making a profit of a mediator equal to or larger than a threshold value,
the mediator mediating the transactions.

Effect

An example advantage according to the present invention is to determine the transition of the combinations between sellers and buyers while guaranteeing the profit of a mediator in changing the combinations.

BRIEF DESCRIPTION OF THE DRAWINGS

FIG. 3 illustrates an example of a data structure of seller information.

FIG. 5 illustrates an example of the data structure of vessel information.

FIG. 12 illustrates an example of a flowchart of a transition sequence calculation process.

FIG. 14 is a display example of a user instruction screen image.

FIG. 16 is a display example of the matching detail screen image.

FIG. 21 illustrates an example of a flowchart showing a processing procedure of the information processing device in the third example embodiment.

EXAMPLE EMBODIMENTS

Hereinafter, example embodiments regarding an information processing device, a control method, and a storage medium will be described with reference to the drawings.

First Example Embodiment (1) System Configuration

Figure 1:
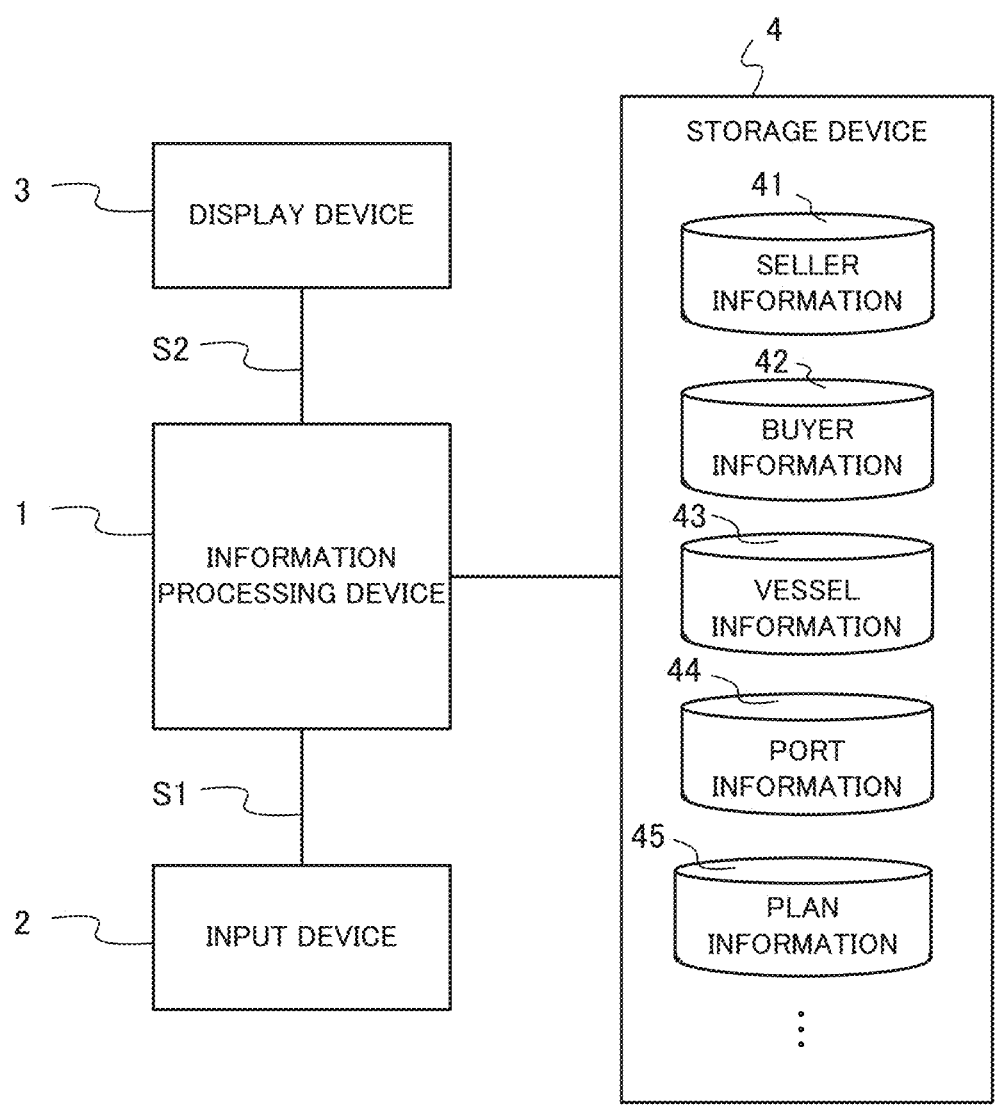
FIG. 1 illustrates a configuration of an optimization system in a first example embodiment.

FIG. 1 shows a configuration of an optimization system 100 according to a first example embodiment. The optimization system 100 mainly includes an information processing device 1, an input device 2, a display device 3, and a storage device 4.

The information processing device 1 performs a process (simply referred to as "optimization process") for determining a combination between the sellers and the buyers of goods (commodity) to be traded and optimizing the transport schedule of the goods. In addition, when changing the current plan into a plan determined by the optimization process, the information processing device 1 calculates a transition sequence of the plans such that a certain profit of the mediator can be guaranteed even when the negotiation failed halfway and the final plan is not achieved. In some embodiments, the information processing device 1 is used by a trading company (firm) who mediates the purchase and sale of goods (transaction target) to be traded. Examples of the goods to be traded may include fuel such as LNG, steel, machinery, electronics, textiles, chemical products, medical-related goods, and foodstuffs.

The information processing device 1 performs data communication with the input device 2, the display device 3, and the storage device 4 through a communication network or through direct wireless or wired communication.

The input device 2 is an interface that accepts the input by the user, and examples of the input device 2 include a touch panel, a button, a voice input device. The input device 2 supplies the input information "S1" generated based on the input by the user to the information processing device 1. In this case, for example, the information processing device 1 generates various kinds of information to be stored in the storage device 4 based on the input information S1 supplied from the input device 2, and specifies conditions or the like designated by the user with respect to the optimization process.

The display device 3 displays information based on the display information "S2" supplied from the information processing device 1, and examples of the display device 3 include a display is and a projector.

The storage device 4 is a memory for storing various kinds of information necessary for the optimization process. The storage device 4 may be an external storage device such as a hard disk connected to or built in to the information processing device 1, or may be a storage medium such as a flash memory. The storage device 4 may be a server device that performs data communication with the information processing device 1. In this case, the storage device 4 may be configured by a plurality of server devices.

The storage device 4 stores seller information 41, buyer information 42, vessel information 43, port information 44, and plan information 45. The seller information 41 is information relating to the sellers of the goods to be traded via the user of the information processing device 1. The buyer information 42 is information relating to the buyers of goods to be traded through the user of the information processing device 1. The vessel information 43 is information relating to vessels which can be used to transport the goods to be traded by the mediator (e.g., trading company) that is the user of the information processing device 1. The port information 44 refers to information on ports (ports of loading or ports of discharge) to be used for transporting goods subject to transaction. The plan information 45 is information indicating the determined plan, and includes information indicating the terms of transaction and the plan details (including the combination between the seller and the buyer) used for the determination of the plan, and the like. The terms of transaction herein indicate conditions necessary for matching (determination of a combination between sellers and buyers, and transport schedule), which are specified by the seller information 41, the buyer information 42, the vessel information 43, and the port information 44.

In addition to the information described above, the storage device 4 may store various kinds of information necessary for the optimization process. For example, the storage device 4 may further store information necessary for calculating the price of the goods to be traded, and the like. Further, the seller information 41, the buyer information 42, the vessel information 43, the port information 44, and the plan information 45 may be generated by a device other than the information processing device 1 in advance, or may be information which the information processing device 1 generates and/or updates based on the input information outputted from the input device 2.

The configuration of the optimization system 100 shown in FIG. 1 is an example, various changes may be applied to the above configuration. For example, the input device 2 and the display device 3 may be integrated into one device. In this case, the input device 2 and the display device 3 may be configured as a tablet terminal integral with the information processing device 1. Further, the information processing device 1 may be configured by a plurality of devices. In this is case, the plurality of devices functioning the information processing device 1 perform the transmission and reception of information necessary for executing the pre-allocated processing among these devices.

(2) Hardware Configuration of Information Processing Device

Figure 2:
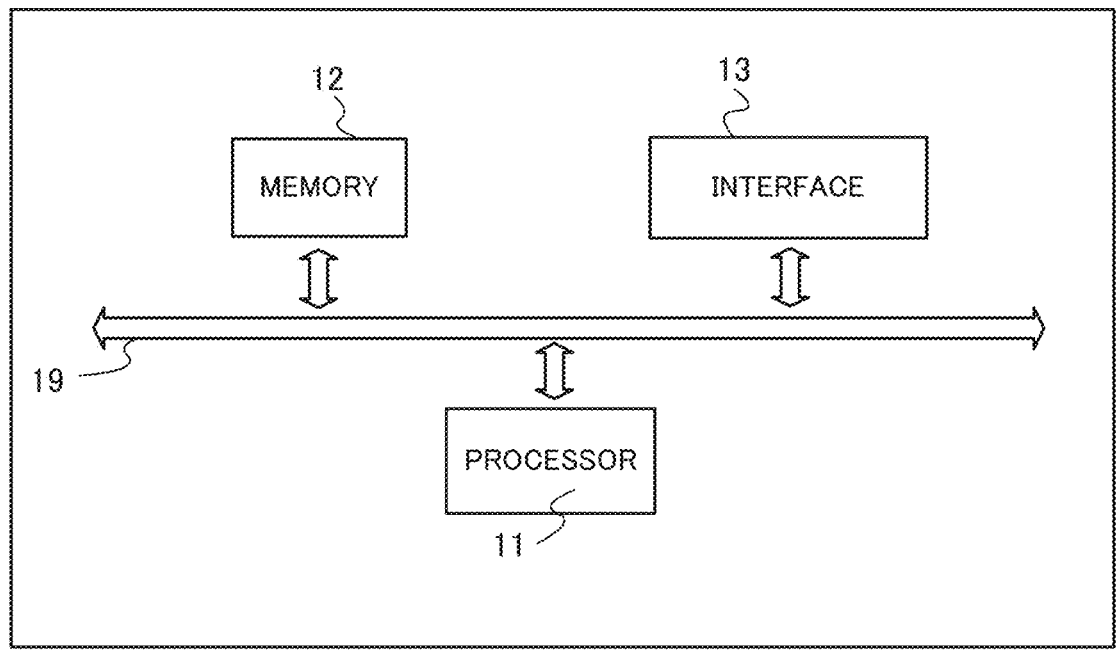
FIG. 2 illustrates a hardware configuration of an information processing device.

FIG. 2 shows a hardware configuration of the information processing device 1. The information processing device 1 includes a processor 11, a memory 12, and an interface 13 as hardware. The processor 11, the memory 12, and the interface 13 are connected to one another via a data bus 19.

The processor 11 executes a predetermined process by executing a program stored in the memory 12. The processor 11 is one or more processors such as a CPU (Central Processing Unit), a GPU (Graphics Processing Unit), and a TPU (Tensor Processing Unit).

The memory 12 is configured by various volatile memories and non-volatile memories such as a RAM (Random Access Memory) and a ROM (Read Only Memory). In addition, a program for executing each process executed by the information processing device 1 is stored in the memory 12. The memory 12 is used as a work memory and temporarily stores information acquired from the storage device 4. The memory 12 may function as a storage device 4. Similarly, the storage device 4 may function as a memory 12 of the information processing device 1. The program executed by the information processing device 1 may be stored in a storage medium other than the memory 12.

The interface 13 is one or more interfaces for electrically connecting the information processing device 1 to other devices. Examples of these interfaces include a wireless interface, such as a network adapter, for transmitting and receiving data to and from other devices wirelessly, and a hardware interface, such as a cable, for connecting to other devices.

The hardware configuration of the information processing device 1 is not limited to the configuration shown in FIG. 2. For example, the information processing device 1 may include at least one of an input device 2 or a display device 3. Further, the information processing device 1 may be connected to or incorporate a sound output device such as a speaker.

(3) Data Structure

Next, an example of a data structure of various information stored in the storage device 4 will be described with reference to FIGS. 3 to 7.

FIG. 3 is an example of the data structure of seller information 41. The seller information 41 is information generated for each of the sellers of goods to be traded, and is information indicating the sell conditions (i.e., the terms of transaction desired by each seller) presented by each seller. Specifically, seller information 41 includes creation date and time information, seller identification information, delivery location information, price information, is delivery period information, loading port information, and trading volume information. Incidentally, the seller information 41 may be information indicating a table or a list having a record with respect to each seller.

The "creation date and time information" is information indicating the date and time when the seller information 41 of interest is generated or changed. Plural records of the seller information 41 whose creation date and time information is different from each other for the same seller maybe stored in the storage device 4. The "seller identification information" is information that identifies each seller of goods to be traded. The seller identification information may include information on the attributes of each seller, such as the company name and location of each seller, in addition to the peculiar ID (seller ID) identifying each seller.

The "delivery location information" is information on the delivery location of the transaction target desired by each seller. For example, the delivery location information includes information indicating whether the delivery location is a port of loading or a port of discharge, and information regarding the port to be the delivery location.

The "price information" is information that indicates the price of goods to be traded desired by each seller. The "delivery period information" is information indicating the delivery period of the goods to be traded desired by each seller. The delivery period is generally set to a longer period as the schedule to delivery is ahead, and is determined in detail as it approaches the timing of delivery.

The "trading volume information" is information indicating the trading volume of goods desired by each seller. For example, the trading volume information is information indicating the lower limit and the upper limit of the trading volume of the goods desired by each seller, respectively. It is noted that when the goods to be traded is fuel, the trading volume is the amount of heat.

Figure 4:
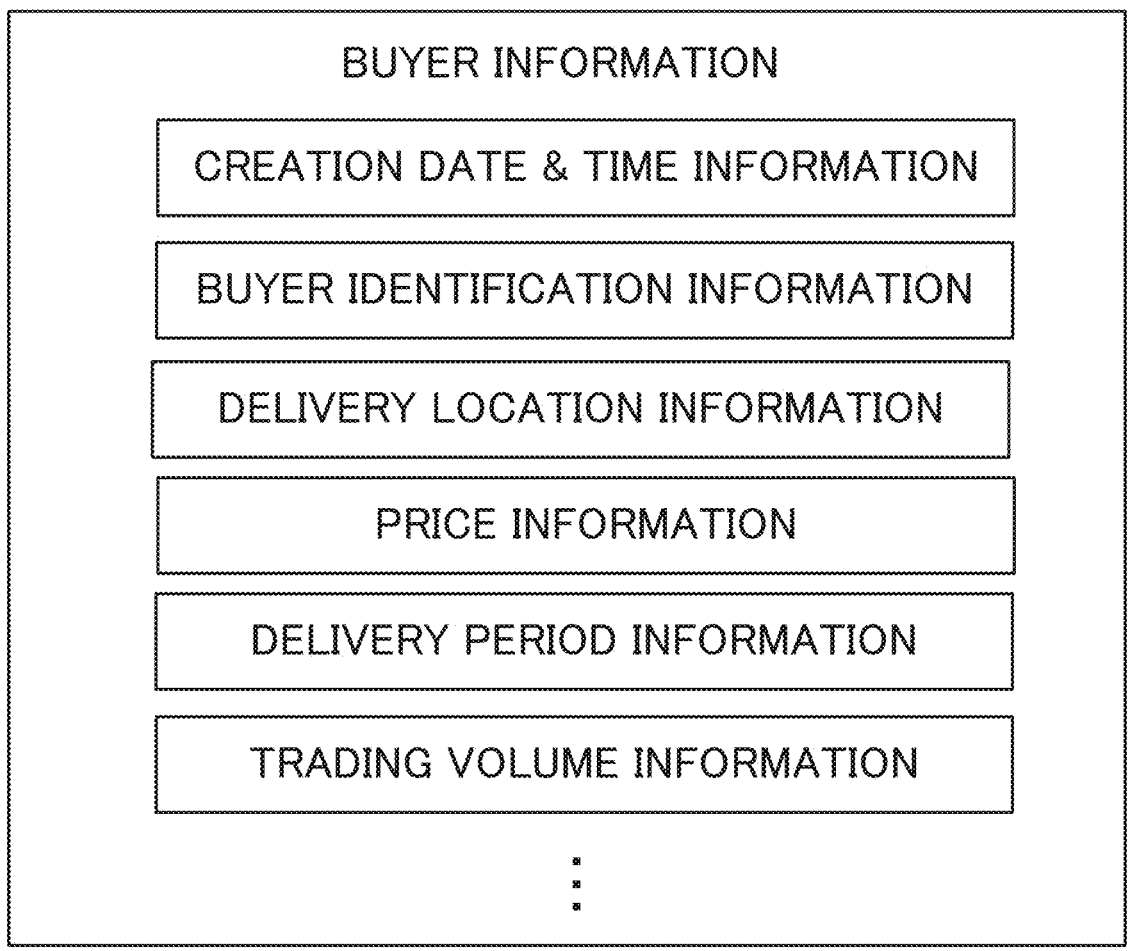
FIG. 4 illustrates an example of the data structure of buyer information.

FIG. 4 is an example of the data structure of the buyer information 42. The buyer information 42 is information generated for each of the buyers of goods to be traded and indicates the buy conditions (i.e., the terms of purchase desired by each buyer) presented by each buyer. Specifically, the buyer information 42 includes creation date and time information, buyer identification information, delivery location information, price information, delivery period information, discharging port information, and trading volume information. The buyer information 42 may be information indicating a table or a list having a record with respect to each buyer.

The "creation date and time information" is information indicating the date and time when the buyer information 42 of interest is generated or changed. Plural records of the buyer information 42 whose creation date and time information is different from each other for the same seller may be stored in the storage device 4. The "buyer identification information" is information that identifies each buyer of goods to be traded. The buyer identification information may include information on the attributes of each buyer, such as the company name and location of each buyer, in addition to the peculiar ID (buyer ID) identifying each buyer.

The "delivery location information" is information on the location of delivery of the transaction target desired by each buyer. For example, the delivery location information includes information indicating whether the delivery location is a port of loading or a port of discharge, and information regarding the port to be the delivery location.

The "price information" is information that indicates the price of goods to be traded desired by each buyer. The "delivery period information" is information indicating the delivery period of goods to be traded desired by each buyer. The delivery period is generally set to a longer period as the schedule to delivery is ahead, and is determined in detail as it approaches the timing of delivery.

The "trading volume information" is information that indicates the volume of traded goods desired by the target buyer. For example, the volume information is information indicating the lower limit and the upper limit of the trading volume of goods desired by the target buyer, respectively.

FIG. 5 is an example of the data structure of the vessel information 43. The vessel information 43 is information generated for each of the vessels that the user of the information processing device 1 can use, and mainly includes vessel name information, load capacity (burden) information, speed information, and fuel efficiency information. The vessel information 43 may be information indicating a table or a list having a record with respect to each vessel. Examples of transport information include the vessel information 43 and the port information 44 to be described later.

The "vessel name information" is information indicating the name of each vessel. The "load capacity information" is information that indicates the amount of goods that each vessel can load. The "speed information" is information on the speed of each vessel (e.g., maximum speed and average speed). The "fuel efficiency information" is information on the fuel efficiency of each vessel. In some embodiments, the fuel efficiency information is information indicating the fuel efficiency of each vessel in accordance with the speed.

It is noted that the vessel information 43 maybe information on vessels (chartered vessels) which can be borrowed in a short term by the user of the information processing device 1. In this case, the vessel information 43 may further include information on the cost of the chartered vessel (such as the chartered cost per day, the fixed cost of the chartered vessel). The vessel information 43 may also further include information on the category of each vessel, information on the size of each vessel, and the like.

Figure 6:
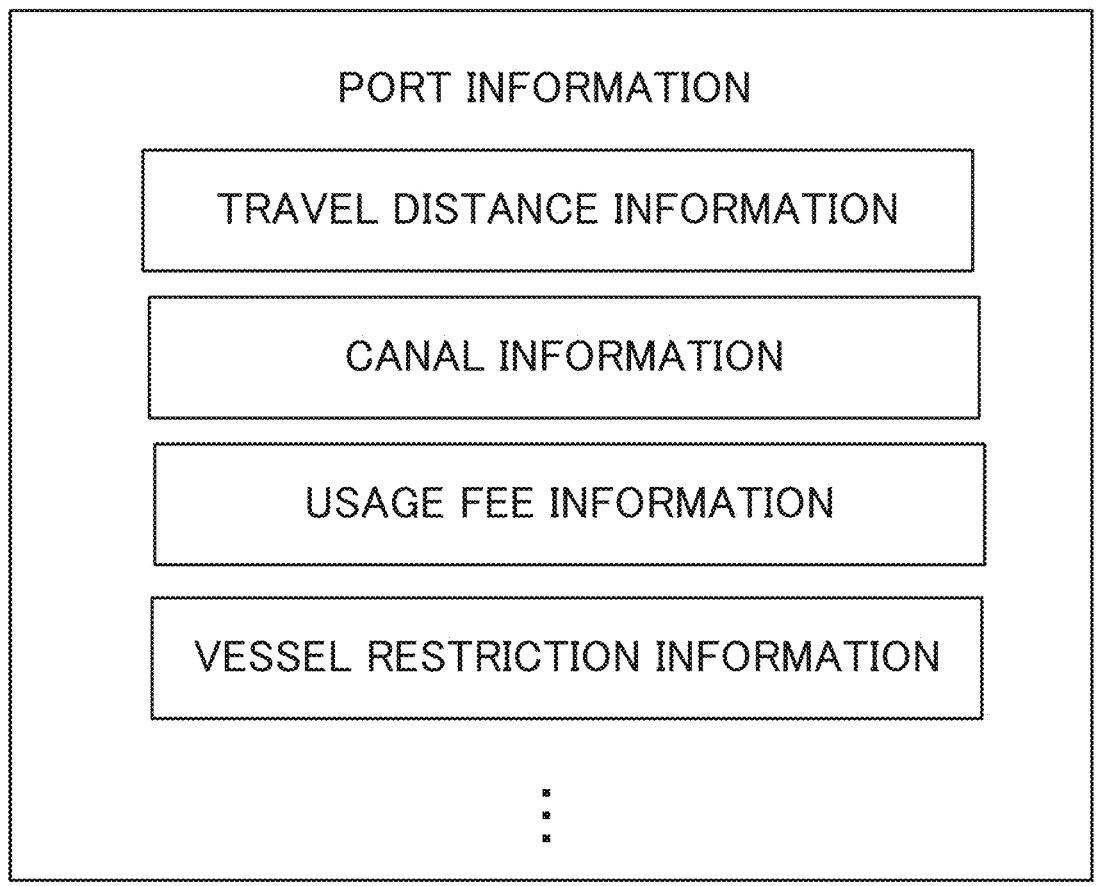
FIG. 6 illustrates an example of the data structure of port information.

FIG. 6 is an example of the data structure of the port information 44. The port information 44 is information regarding a port that is a candidate for a port of loading or a port of discharge, including travel distance information, canal information, usage fee information, and vessel restriction information.

The "travel distance information" is information indicating the travel distance between ports. The travel distance information is, for example, a table information indicating the travel distance from a port of loading to a port of discharge with respect to each possible combination of a candidate port of loading and a candidate port of discharge.

The "canal information" is information that indicates the canals (e.g., Panama Canal and Suez Canal) where a toll to pass when traveling between ports occurs. The canal information is, for example, a table information indicating the canal to pass when moving from a port of loading to a port of discharge with respect to each possible combination of a candidate port of loading and a candidate port of discharge.

The "usage fee information" is information indicating a usage fee for each port. The usage fee information may also include information on the toll of the canal where the toll occurs.

The "vessel restriction information" is information indicating vessels that are not permitted to use each port. For example, the vessel restriction information is a table information indicating, for each port, the presence or absence of restrictions for each of the vessels that the user of the information processing device 1 can use.

Figure 7:
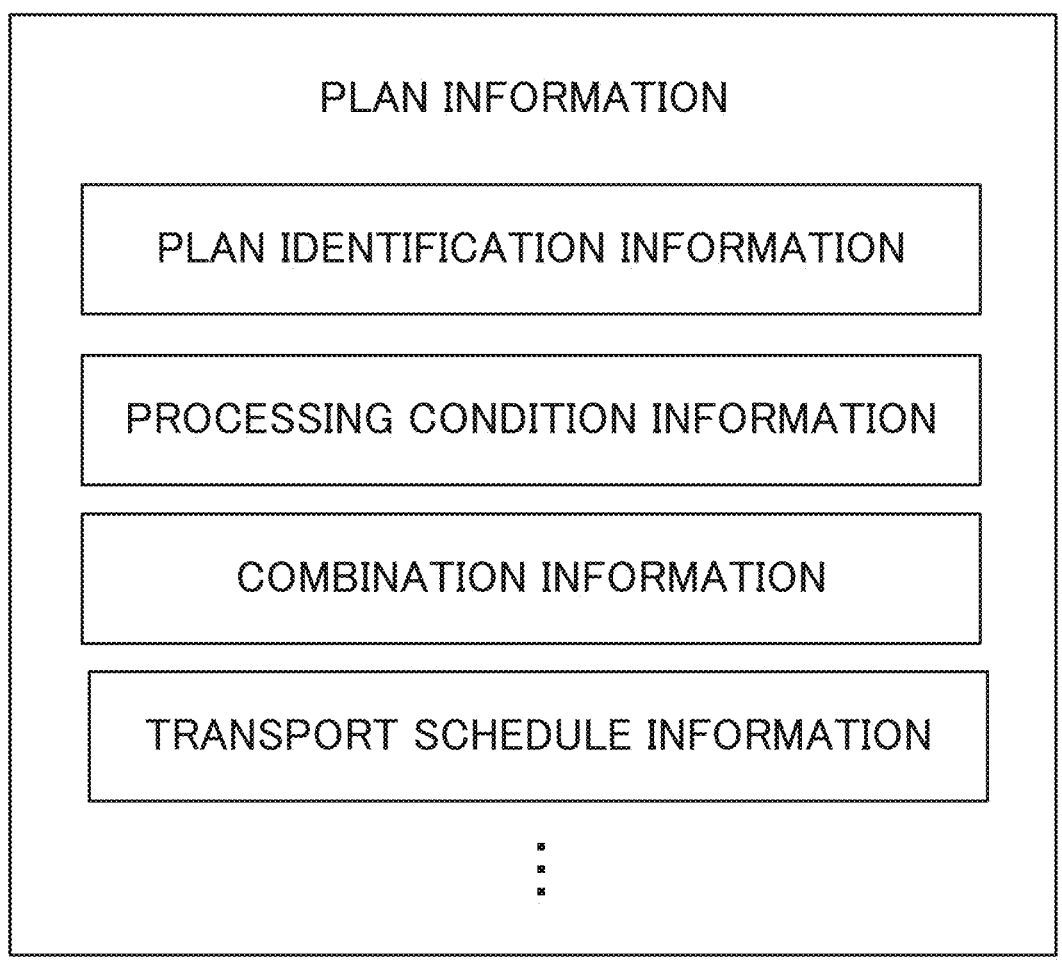
FIG. 7 illustrates an example of the data structure of plan information.

FIG. 7 is an example of the data structure of the plan information 45. The plan information 45 is information generated for each plan related to the entire transactions, and includes plan identification information, processing condition information, combination information, and transport schedule information.

The "plan identification information" is identification information allocated for each plan. For example, the plan identification information is information that indicates the name (plan name) of the plan specified by user input or the like. The "processing condition information" is information indicating terms of transaction (such as sell conditions and buy conditions) at the time point of formulating the corresponding plan.

The "combination information" is information indicating the combination between the sellers and the buyers matched in the plan. The "transport schedule information" is information indicating the transport schedule regarding the plan. In addition to the above-mentioned information, the plan information 45 may further include information such as the profit, revenue, and cost (expense) of the mediator that occurs when the combination between the sellers and the buyers indicated by the corresponding combination information and the transport schedule indicated by the corresponding transport schedule information are adopted.

(4) Processing Details

Next, a description will be given of the process to be performed by the information processing device 1 in the first example embodiment. Schematically, when changing the current plan into the plan determined by the optimization process, the information processing device 1 calculates a transition sequence (also referred to as "profit guaranteed transition sequence") of plans in which a certain profit of the mediator is guaranteed for each plan. Thereby, the information processing device 1 suitably presents a transition of the plans such that the profit of the mediator is guaranteed to a certain extent even when the negotiation on the way ends in failure and the final plan is not achieved.

Hereafter, for convenience of explanation, the initial (current) plan before the change is referred to as "initial plan", the plan to be a target into which the initial plan is to be changed is also referred to as "target plan". For example, the initial plan corresponds to a plan in which there is room for optimization as determined manually (by manual approach), and the target plan corresponds to a plan determined so that the profit of the mediator is maximized by optimization (i.e., the plan whose profit of the mediator is equal to or larger than the profit for the initial plan).

(4-1) Functional Blocks

Figure 8:
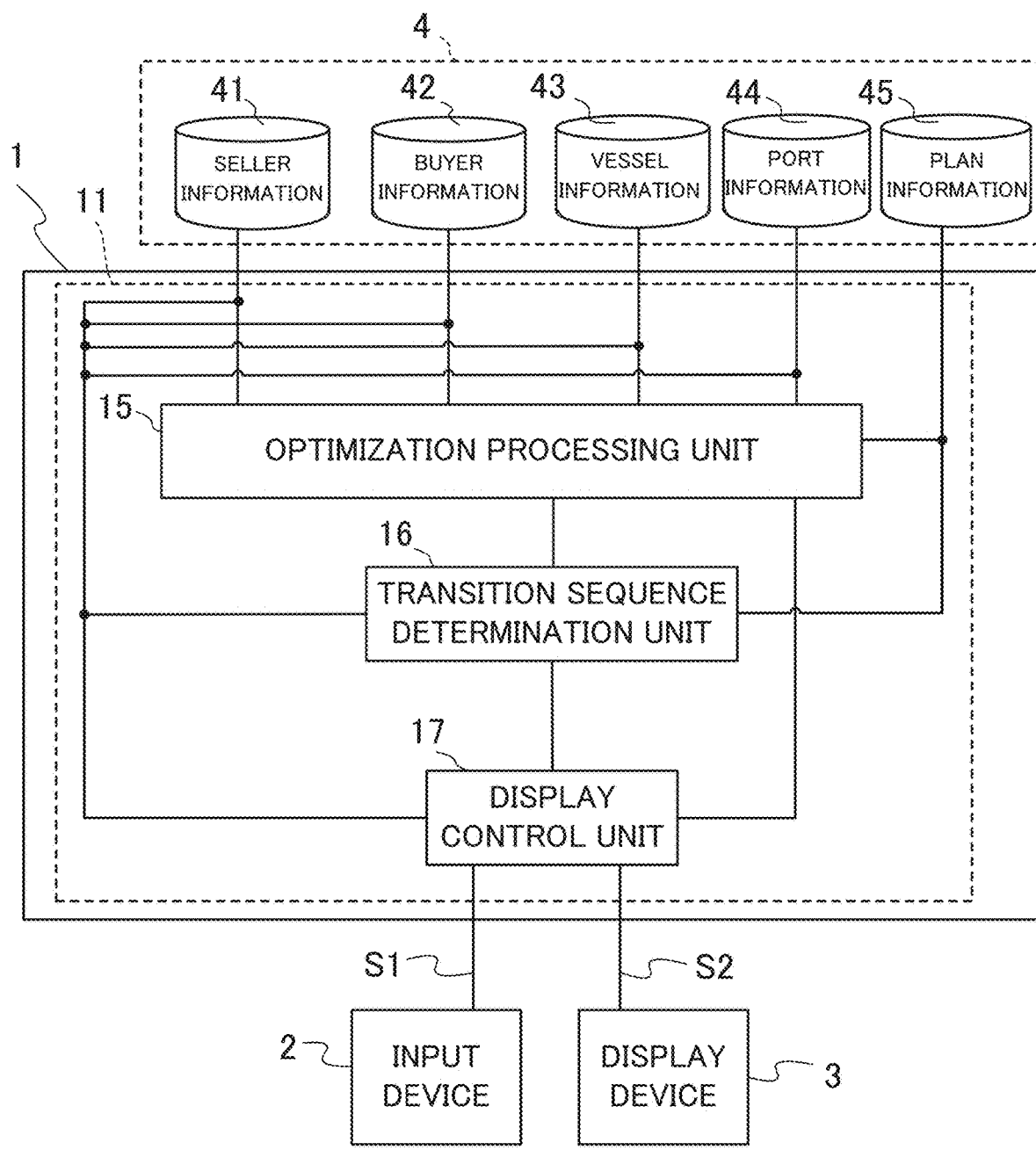
FIG. 8 illustrates a functional block diagram of the information processing device.

FIG. 8 is an example of a functional blocks of an information processing device 1 that executes the optimization process relating to the determination of a combination between sellers and buyers and a transport schedule by vessels. The processor 11 of the information processing device 1 functionally includes an optimization processing unit 15, a transition sequence determination unit 16, and a display control unit 17. In FIG. 8, any two blocks to exchange data with each other are connected by a solid line, but the combination of the blocks to exchange data with each other is not limited to FIG. 8. The same applies to the drawings of other functional blocks described below.

The optimization processing unit 15 determines the combination between the sellers and the buyers and to establish the transaction and the transport schedule by performing optimization that maximizes the profit of the mediator. In this case, the optimization processing unit 15 acquires the seller information 41 corresponding to a plurality of sellers to be matched, by referring to the storage device 4. The optimization processing unit 15 acquires the buyer information 42 corresponding to a plurality of buyers to be matched, by referring to the storage device 4. Further, the optimization processing unit 15 acquires the vessel information 43 that is transport information of the goods to be traded and port information 44, by referring to the storage device 4. The optimization processing unit 15 sets constraints based on the seller information 41, the buyer information 42, and the transport information, and obtains a combination between the sellers and is the buyers and the transport schedule by optimization so that the profit of the mediator is maximized.

In this case, the optimization processing unit 15 considers a combinatorial optimization problem to determine the combination of the sellers and the buyers and the transport schedule which maximize the profit of a mediator who is a user of the information processing device 1 and formulates it into an integer programming (mixed integer programming) problem. In other words, the optimization processing unit 15 considers determination of the combinations of the sellers, the buyers, the vessels to be used, and the navigation period of the vessels as a combination optimization problem and formulates it into an integer programming problem. The optimization processing unit 15 obtains a solution on the formulated integer programming problem by performing a process equivalent to the process by a general application program (e.g., IBM ILOG CPLEX, Gurobi Optimizer, SCIP). Specifically, the optimization processing unit 15 inputs, to the above-described application program, constraints on the transactions and the transport in the form of linear integer constraints and a linear objective function that defines the profit. Thereby, the optimization processing unit 15 recognizes the transactions and the transport plan that maximizes the profit. In this case, the optimization processing unit 15 also determines the delivery time and the trading volume and the like, at which the profit of the user is maximized. It is noted the assignment of vessels when transport is required can also be described as integer constraints. An approach for formulating an integer programming problem to determine the sellers, buyers, vessels to be used, and the duration of navigation of the vessels is disclosed, for example, in the international publication WO2021/001977.

The optimization processing unit 15 may store information indicating the execution result of the optimization processing in the storage device 4 as the plan information 45. In this case, as illustrated in the data structure shown in FIG. 7, the optimization processing unit 15 stores the plan information 45 in which the processing condition information, the combination information, the transport schedule information, and the like are associated with the plan identification information indicating the plan of interest. The plan determined by the optimization processing unit 15 is referred to as a target plan by the transition sequence determination unit 16.

The transition sequence determination unit 16 determines the profit guaranteed transition sequence based on the initial plan and the target plan. In this case, if one or more parameters to be required for determination of the profit guaranteed transition sequence based on the input information S1, the transition sequence determination unit 16 determines the profit guaranteed transition sequence based on the specified parameters. Examples of the above-mentioned parameters include a lower limit value (also referred to as "profit threshold value $\theta$") of the mediator's profit to be met in each plan that is an element of the profit guaranteed transition sequence. The profit threshold value $\theta$ is set based on the profit for the initial plan. The process executed by the transition sequence determination unit 16 will be described in detail in the section "(4-2) Transition Sequence Calculation Process".

The display control unit 17 generates display information S2 for displaying a screen image indicating the processing result or the like outputted by the optimization processing unit 15 or the transition sequence determination unit 16. Then, the display control unit 17 supplies the generated display information S2 to the display device 3 thereby to display a screen image showing the process result or the like described above on the display device 3. The display control unit 17 receives an input of information required for the transition sequence determination unit 16, such as an input for specifying the parameters including the profit threshold value $\theta$ and an input for specifying the initial plan, and supplies input information S1 indicating the received input to the transition sequence determination unit 16.

Each component of the optimization processing unit 15, the transition sequence determination unit 16, and the display control unit 17 described in FIG. 8 can be realized, for example, by the processor 11 executing a program. The necessary programs may be recorded on any non-volatile storage medium and installed as necessary to realize each component. It should be noted that at least a portion of these components may be implemented by any combination of hardware, firmware, and software, or the like, without being limited to being implemented by software based on a program. At least some of these components may also be implemented using a user programmable integrated circuit such as a FPGA (Field-Programmable Gate Array) and a microcontroller. In this case, the integrated circuit may be used to realize a program to function as each of the above components. Further, at least some of the components may be realized by ASSP (Application Specific Standard Produce), ASIC (Application Specific Integrated Circuit), or quantum processor (quantum computer control chip). Thus, each component may be implemented by various hardware. The above is also true for other example embodiments described later. Furthermore, each of these components may be implemented by the cooperation of a plurality of computers, for example, using cloud computing technology.

(4-2) Transition Sequence Calculation Process

Next, a specific description will be given of a transition sequence calculation process that is a process of calculating the profit guaranteed transition sequence to be executed by the transition sequence determination unit 1. Hereafter, for convenience of explanation, "R" denotes a set of solutions (i.e., the combinations between the sellers and the buyers) of matching that satisfy the terms of transaction. Besides, the solution "x" ($x \in R$) of the optimization process indicates a combination between the sellers and the buyers equivalent to the initial plan, and the solution "y" ($y \in R$) of the optimization process indicates a combination between the sellers and the buyers equivalent to the target plan.

In this case, the transition sequence determination unit 16 calculates the following profit guaranteed transition sequence in which the profit is guaranteed to be equal to or larger than the profit threshold value θ.

$$<x, x_1, x_2, \ldots, x_{m-1}, y>$$

Here, the solution $x_i$ (i=1, ..., m−1) belongs to the set R. The solution $x_{i+1}$ is obtained by applying the basic operation described later to the solution $x_i$ once. Assuming that the function $f(x_i)$ indicates the profit of the mediator when the plan is executed based on the solution $x_i$, the following equation is true.

$$f(x_i) \geq \theta$$

Here, the setting of the profit threshold value θ will be described. The transition sequence determination unit 16 may autonomously set the profit threshold value θ based on the profit for the solution x corresponding to the initial plan, or may set (i.e., manually set) the profit threshold value θ to be the profit indicated by the input information S1 which is an external input. In the former example, the transition sequence determination unit 16 may set the profit threshold value θ to be the profit for the solution x corresponding to the initial plan, or may set it to be a value obtained by increasing or decreasing the profit for the solution x by a predetermined rate or a predetermined value.

The transition sequence determination unit 16 may set multiple profit threshold values θ based on the profit for the solution x corresponding to the initial plan, and sets the profit guaranteed transition sequence for each of the plural profit threshold values θ. In this case, for example, the transition sequence determination unit 16 sets a predetermined number of the profit threshold values θ at equal intervals so that the profit for the initial plan is the median or average value thereof. In general, there is such a tendency that the number of elements of the profit guaranteed transition sequence to be obtained decreases with decreasing profit threshold value θ, and the effort for changing the plan also decreases accordingly.

Next, a description will be given of the basic operation. Hereafter, each pair (tuple) of a seller and a buyer determined by the solution is also referred to as "buying and selling pair". The basic operation is at least one of an operation (pair switching operation) of switching the buyer-and-seller correspondences between two buying and selling pairs, or, an operation (pair addition/deletion operation) of dissolution or addition of a buying and selling pair. Namely, basic operations may only include pair switching operations or may include pair switching operations and pair addition/deletion operations.

Figure 9A:
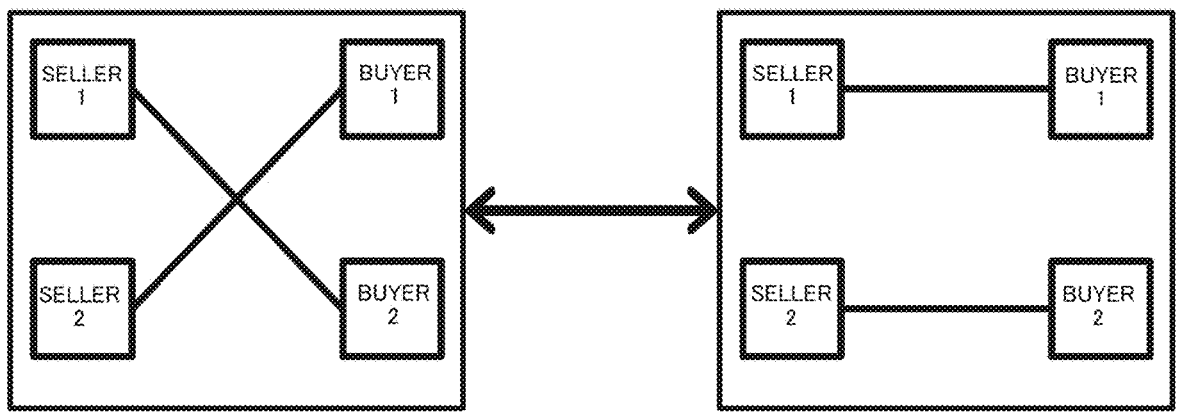
FIG. 9A illustrates buying and selling pairs before and after a pair switching operation is performed.
Figure 9B:
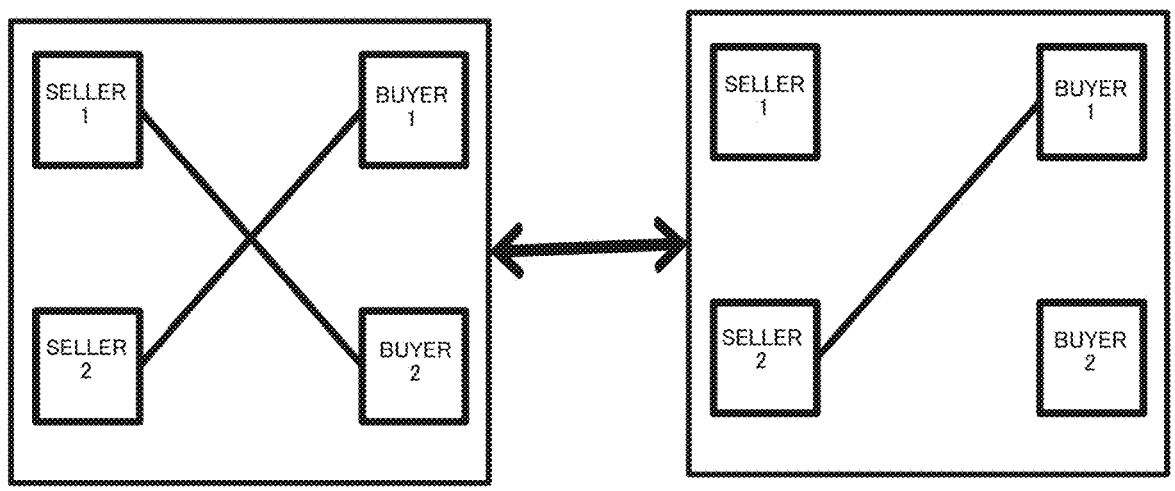
FIG. 9B illustrates buying and selling pairs before and after a pair addition/deletion operation is performed.

FIG. 9A illustrates buying and selling pairs before and after one pair switching operation is performed, FIG. 9B illustrates buying and selling pairs before and after one pair addition/deletion operation is performed. FIGS. 9A and 9B each shows two buying and selling pairs configured by two sellers ("seller 1" and "seller 2") and two buyers ("buyer 1" and "buyer 2"). In the example shown in FIG. 9A, the buyers paired with the seller 1 and the seller 2 are switched by a pair switching operation. Further, in the example shown in FIG. 9B, by a pair addition/deletion operation, deletion or addition of a buying and selling pair of the seller 1 and the buyer 2 has occurred. Then, such a basic operation is repeatedly applied to the solution x corresponding to the initial plan, which enables the transition of the solution x corresponding to the initial plan into the solution y corresponding to the target plan.

Next, a specific example of generating a profit guaranteed transition sequence that is guaranteed profit to be equal to or greater than the profit threshold value θ will be described.

Figure 10A:
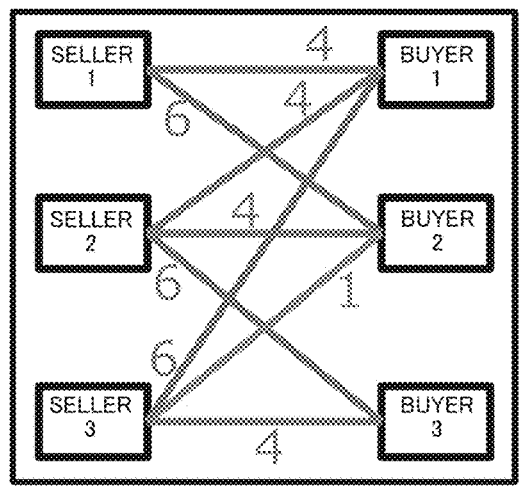
FIG. 10A illustrates possible buying and selling pairs and profits for respective buying and selling pairs.
Figure 10B:
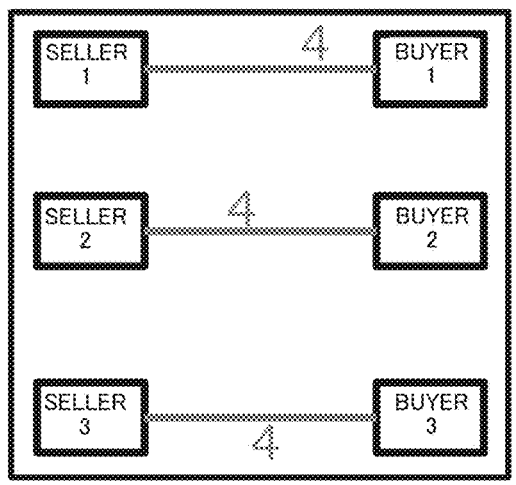
FIG. 10B illustrates a matching result corresponding to the initial plan.
Figure 10C:
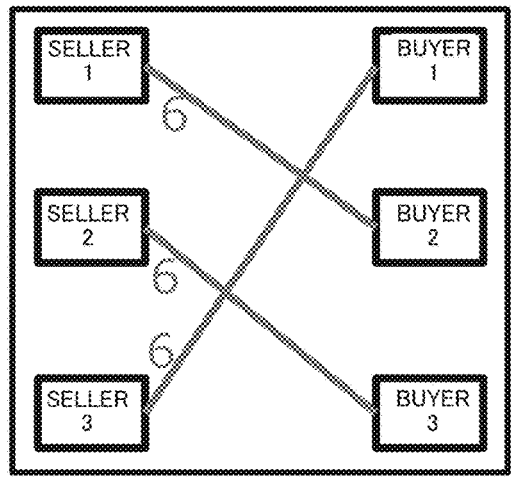
FIG. 10C illustrates a matching result corresponding to the target plan.

FIG. 10A is a diagram showing possible buying and selling pairs between the sellers ("seller 1", "seller 2", and "seller 3") and the buyers ("buyer 1", "buyer 2", and "buyer 3") with clear indication of a numerical value representing the profit generated for each possible buying and selling pair. FIG. 10B shows the combination (matching result) between the sellers and the buyers corresponding to the solution x, and FIG. 10C shows the combination (matching result) between the sellers and the buyers corresponding to the solution y. The profit for the solution x shown in FIG. 10B is 12 whereas the profit for the solution y shown in FIG. 10C is 18.

Figure 11:
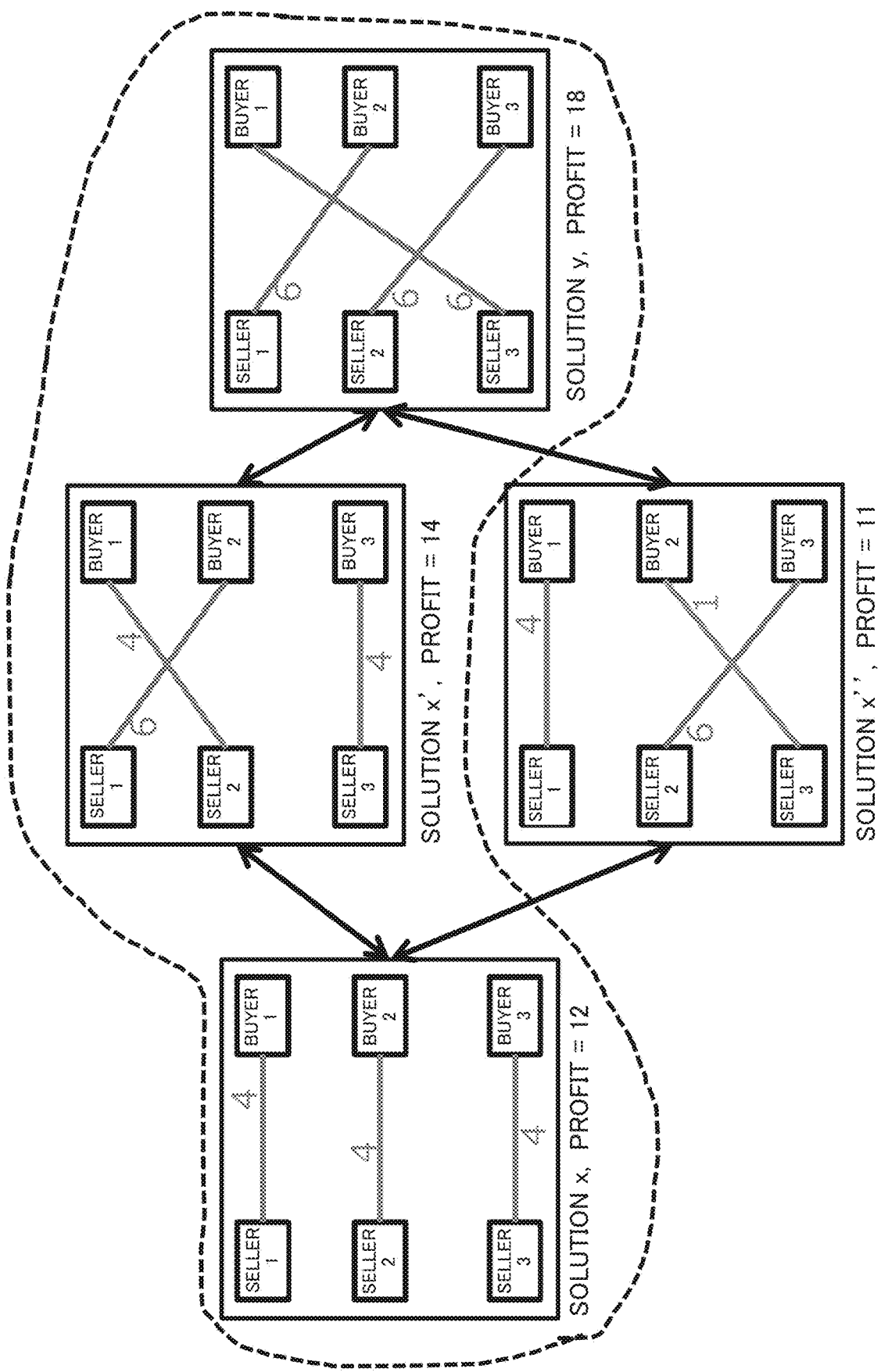
FIG. 11 is a diagram showing a transition of the matching results by application of a basic operation.

FIG. 11 is a diagram showing the transition of solutions to the solution y by applying basic operations to the solution x. As shown in FIG. 11, the solution "x'" or solution "x''" is obtained by applying a pair switching operation, which is a basic operation, to the solution x once. Then, the solution y is obtained by further applying a pair switching operation to the solution x' and the solution x''.

In FIG. 11, a description will be given of outputting a profit guaranteed transition sequence in which the profit for the solution x is guaranteed (i.e., the profit threshold value θ is set to the profit for the solution x). In this instance, the profit for the solution x' is "14" and is therefore equal to or greater than the profit threshold value θ (here, "θ=12") set to the profit for the solution x. Thus, the solution transition sequence {x, x', y} is a profit guaranteed transition sequence. On the other hand, the profit for the solution x'' is "11" and is therefore less than the profit threshold value θ. Thus, the solution transition sequence {x, x'', y} is not a profit guaranteed transition sequence.

Next, a specific algorithm of the transition sequence calculation process will be described. Hereafter, as an example, a method of calculating the profit guaranteed transition sequence based on the A* (A-star) algorithm (including the width-first search algorithm and the Dyxtra method) will be described.

First, the definition of the heuristic function h in the A* algorithm will be described. In is this case, the heuristic function "h (z, y)" (z∈R) is defined as the lower limit of the number of basic operations required to transition from solution z to solution y. For example, when the pair switching operation shown in FIG. 9A is used as the basic operation, the following equation becomes true.

$$h(z, y) = \text{(the number of buying and selling pairs not matched between the solution } z \text{ and the solution } y\text{)}$$

Here, assuming that "$y_{s,b}=1$" in the solution y denotes that the seller s is paired with the buyer b as a buying and selling pair (and $y_{s,b}=0$ denotes that the seller s is not paired with the buyer b as a buying and selling pair), and that "$z_{s,b}=1$" in the solution z denotes that the seller s is paired with the buyer b as a buying and selling pair (and $z_{s,b}=0$ denotes that the seller s is not paired with the buyer b as a buying and selling pair), then the function h is rewritten as follows:

$$h(z,y) = \Sigma_{s=1} \Sigma_{b=1} [\text{if "}y_{s,b} \neq z_{s,b}\text{", then 1}]/2.$$

Further, when the pair addition/deletion operation shown in FIG. 9B is used as the basic operation, the functions h (z, y) indicates "the number of buying and selling pairs that do not match between the solution z and the solution y". Namely, the function h is expressed as follows.

$$h(z,y)=\Sigma_{s=1}\Sigma_{b=1}[\text{if } "y_{s,b} \neq z_{s,b}", \text{then } 1]$$

Specific information relating to the definition of the function h and the definition of the basic operation is previously stored in the storage device 4 or the memory 12. It is noted that in the calculation of the profit guaranteed transition sequence, it is necessary to make the transition while guaranteeing that the profit is equal to or greater than the profit threshold value θ, so it is not always possible to make a transition from the solution z to the solution y by h (z, y) times of basic operations.

FIG. 12 is an example of a flowchart of a transition sequence calculation process based on the A* algorithm. Hereafter, the transition sequence determination unit 16 performs processing based on graph theory by regarding any solution belonging to the set R as a node.

First, the transition sequence determination unit 16 performs an initialization process (step S11). In this instance, the transition sequence determination unit 16 stores the solution x in an "OPEN list", which is the list of nodes that can be opened at present, and determines "score [x]", which represents the score (the sum of the actual cost and the estimated cost) of the solution x, to be the value of the function h (x, y).

Next, the transition sequence determination unit 16 determines whether or not the OPEN list is empty (step S12). Then, when it is determined that the OPEN list is not empty (step S12; No), the transition sequence determination unit 16 takes out a node z with the smallest score [z] from the OPEN list and deletes it from the OPEN list (step S13).

Then, the transition sequence determination unit 16 determines whether or not the node z is taken out at step S13 is the node y (step S14). Then, if the node z taken out at step S13 is not the node y (step S14; No), the transition sequence determination unit 16 sets a variable "tmp_g" that stores the actual cost of the next node obtained by applying one basic operation to the node z (step S15). In this case, the transition sequence determination unit 16 sets tmp_g to be a value obtained by adding the number of times "1" of the applied basic operation to the actual cost "g[z]" for the node z.

Next, the transition sequence determination unit 16 specifies the node z' (∈R) whose profit is equal to or larger than the profit threshold value θ, wherein the node z' is obtained by applying one basic operation to the node z taken out at step S13 (step S16). The transition sequence determination unit 16 determines, for the node z' specified at step S16, whether or not either g[z'] is undefined or "tmp_g<g[z']" is true (step S17). If g [z'] is not undefined and "tmp_g<g[z']" is not true (step S17; No), the transition sequence determination unit 16 determines that there is no need to add the node z' to the OPEN list and gets back to the process at step S12. It is noted that the transition sequence determination unit 16 also gets back to the process at step S12 if there is no node z' whose profit is equal to or larger than the profit threshold value θ.

On the other hand, if g[z'] is undefined or "tmp_g<g[z']" is true (step S17; Yes), the transition sequence determination unit 16 adds the node z' to the OPEN list (step S18). In this case, the transition sequence determination unit 16 sets "cameFrom[z']", which represents the node immediately before the application of the basic operation, to be the node z, sets the actual cost g[z'] of the node z' to be "tmp_g", and sets the score [z'] regarding the solution z' to be "g[z']+h (z', y)". The variable "cameFrom" is required to construct the transition sequence at step S19 described below.

Further, at step S14, if the node z taken out at step S13 is the node y (step S14; Yes), the transition sequence determination unit 16 determines that the search for the solution y has been successfully completed and then extracts (or restores) the transition sequence based on the "cameFrom" set at step S18 (step S19). In this case, the transition sequence determination unit 16 identifies the preceding node based on the cameFrom [z] of the node z, and identifies the node before the preceding node based on the cameFrom of the preceding node. By repeating such identification until it identifies the node x, the transition sequence determination unit 16 extracts the transition sequence. Then, the transition sequence determination unit 16 uses the extracted transition sequence as the profit guaranteed transition sequence, and outputs the profit guaranteed transition sequence to the display control unit 17.

Further, when it is determined at the step S12 that the OPEN list is empty (step S12; Yes), the transition sequence determination unit 16 determines that the search for the solution y has not been successfully completed because it has not been able to search for the node y. Therefore, in is this case, the transition sequence determination unit 16 outputs to the display control unit 17 information indicative of non-existence of the profit guaranteed transition sequence satisfying the conditions (the conditions regarding the terms of transaction and the profit threshold value θ) (step S20).

Thus, according to the processing of the flowchart described above, the transition sequence determination unit 16 can suitably makes the determination of presence or absence of the profit guaranteed transition sequence in which the profit is guaranteed to be at least the profit threshold value θ and calculate the profit guaranteed transition sequence if there is a profit guaranteed transition sequence.

Figure 13A:
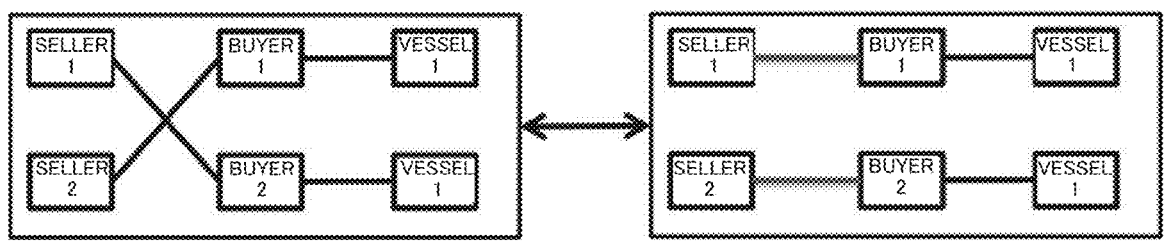
FIG. 13A is a diagram showing a basic operation of switching buyer-and-seller correspondences between tuples each including a buyer, a seller, and a vessel to be used.
Figure 13B:
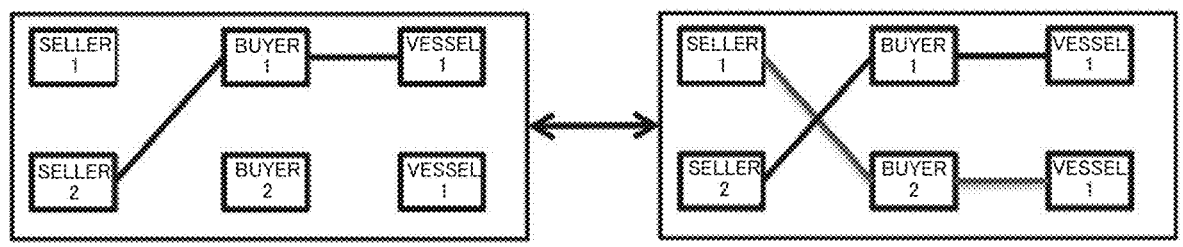
FIG. 13B is a diagram showing a basic operation relating to the dissolution or addition of a tuple including a seller, a buyer, and a vessel to be used.

Here, a description will be supplementally given of the determination of the profit guaranteed transition sequence considering the transport schedule. FIG. 13A and FIG. 13B are diagrams showing an outline of the basic operations for combinations (also referred to as "buyer-seller-vessel tuples") of sellers and buyers and vessels to be used. The basic operation for buyer-seller-vessel tuples indicate at least one of a switching operation (refer to FIG. 13A), which is an operation to switch buyer-and-seller correspondences between buyer-seller-vessel tuples, and an addition/deletion operation (see FIG. 13B) to delete or add one buyer-seller-vessel tuple. It should be noted that any possible buyer-seller-vessel tuple can be added by the addition of the tuple. In the example shown in FIG. 13A, the buyer to be paired with the seller 1 and the buyer to be paired with the seller 2 are switched by the switching operation. In the example shown in FIG. 13B, deletion or addition of the tuple of the seller 1, the buyer 2, and the vessel 2 has occurred due to the addition/deletion operation. Then, by repeatedly executing such basic operations, it is possible to make a transition from the solution x corresponding to the initial plan to the solution y corresponding to the target plan.

(4-3) Display Examples

Next, a description will be given of various screen images to be displayed on the display device 3 based on the display information S2 supplied from the display control unit 17 of the information processing device 1. Hereinafter, a description will be given, in sequence, of the user instruction screen image which is a screen image to be used by a user to instruct the calculation of the profit guaranteed transition sequence, the transition sequence display screen image which is a screen image for displaying the processing result of the transition sequence calculation, and the matching detail screen image which is a screen image for displaying the detail of the matching result corresponding to an individual plan.

FIG. 14 is a display example of a user instruction screen image displayed on the display device 3 based on the display information S2 generated by the display control unit 17 of the information processing device 1. The display control unit 17 causes the display device 3 to is display a plan list table 66, a threshold value designation field 67, and a processing start button 69 on the user instruction screen image.

The plan list table 66 is a table showing an outline of plans (including a plan determined by the optimization processing unit 15) stored as the plan information 45. The plan list table 66 has items of "plan name", "creation date and time", "profit", "revenue", and "expenditure". Here, the "first plan" corresponds to a plan manually formulated, and the "fourth plan" corresponds to a plan determined by performing an optimization process under the same conditions as the first plan. Then, the plan list table 66 allows the user to specify the initial plan and the target plan on the basis of the user input, respectively. Here, "the first plan" is specified as the initial plan and "the fourth plan" is specified as the target plan.

The threshold designation field 67 is an input field that accepts the user input regarding the profit threshold value θ, and here, as an example, is a selection field in the form of a radio button. The threshold designation field 67 has three options of "guarantee profit for initial plan", "simulate by multiple θ" and "specify θ".

If "guarantee profit for initial plan" is selected, transition sequence determination unit 16 sets the profit threshold value θ to be the profit of the mediator in the initial plan. Further, if "specify θ" is selected, the transition sequence determination unit 16 sets the profit threshold value θ to be a numerical value inputted to the input field 670 provided in the threshold designation field 67. In addition, when "simulate by multiple θ" is selected, the transition sequence determination unit 16 sets a plurality of profit threshold values θ on the basis of the profit for the initial plan, and performs transition sequence calculation process based on the set respective profit threshold values θ.

When it is detected that the processing start button 69 is selected, the display control unit 17 supplies the information on the initial plan and the target plan specified in the plan list table 66 and the information on the profit threshold value θ specified in the threshold designation field 67 to the transition sequence determination unit 16. Then, the transition sequence determination unit 16 starts the transition sequence calculation process on the basis of these supplied information.

In the user instruction screen image, instead of accepting the input to specify both the initial plan and the target plan, the display control unit 17 may accept an input to specify only the initial plan. In this case, the display control unit 17, for example, instructs the optimization processing unit 15 to start the optimization process with the same terms of transaction as the initial plan. Then, the transition sequence determination unit 16 sets the matching result obtained through the optimization process by the optimization processing unit 15 as the target plan and executes the calculation process of the transition sequence from the initial plan specified on the user instruction screen image to the target plan.

Figure 15:
FIG. 15 is a display example of the transition sequence display screen image.

FIG. 15 is a display example of the transition sequence display screen image. The display control unit 17 displays a transition sequence list table 70 on the transition sequence display screen image shown in FIG. 15.

The transition sequence list table 70 is a table in which records of the plans corresponding to respective solutions constituting the profit guaranteed transition sequence calculated by the transition sequence determination unit 16 are arranged in order of the number of times the basic operation is applied. In the transition sequence list table 70, as the plans corresponding to respective solutions constituting the profit guaranteed transition sequence, there are arranged a "first plan" which is the initial plan, "first transition plan" to "fourth transition plan" which are plans in the middle of transition from the initial plan to the target plan, and a "fourth plan" which is the target plan. The transition sequence list table 70 has each item of "plan name", "number of basic operations to target plan", "profit", "revenue", and "expenditure". The "number of basic operations to target plan" refers to the number of times the basic operation is applied to make a transition to the fourth plan, which is the target plan.

The display control unit 17 displays, based on the processing result of the transition sequence determination unit 16, the transition sequence display screen image as shown in FIG. 15, which makes it possible to suitably present to the user the profits in the middle of each negotiation from the initial plan to the target plan. If there is no profit guaranteed transition sequence satisfying the set profit threshold value θ, the display control unit 17 causes the display device 3 to display information indicating that there is no profit guaranteed transition sequence, together with information prompting resetting of the profit threshold value θ.

In the case where "simulation by multiple θ" is selected in the threshold designation field 67 on the user instruction screen image shown in FIG. 14, the display control unit 17 displays information on the profit guaranteed transition sequence corresponding to each of the set profit threshold values θ, on the transition sequence display screen image. In this case, for example, the display control unit 17 provides a designation field in a pull-down menu format or the like for specifying a profit threshold value θ, and displays the transition sequence list table 70 indicating the profit guaranteed transition sequence corresponding to the profit threshold value θ specified in the designation field, on the transition sequence display screen image. In another example, the display control unit 17 may display a list of information summarizing the profit guaranteed transition sequences for respective profit threshold values θ on the transition sequence display screen image. In this case, examples of the above-mentioned information summarizing the profit guaranteed transition sequences include the setting value of the profit threshold value θ, the number of times the basic operation is applied to make a transition from the initial plan to the target plan, the lowest value of the profit in the plans that are elements of the profit guaranteed transition sequence. Thus, the display control unit 17 can allow the user to select an appropriate transition path to the target plan in consideration of the profit threshold value θ and the negotiation labor.

Further, when an arbitrary record of the transition sequence list table 70 is selected, the display control unit 17 displays a matching detail screen image representing the matching result corresponding to the selected record on the display unit 3.

FIG. 16 is a display example of the matching detail screen image. The display control unit 17 displays a matching table 71 on the matching detail screen image shown in FIG. 16.

The matching table 71 mainly has each major item of "seller information", "buyer information", "deal matching information". The major item "seller information" includes sub-items of "seller ID", "trading condition", "price", "start of delivery", "end of delivery", "lower limit of heat amount", and "upper limit of heat amount". The major item "buyer information" includes sub-items of "buyer ID", "trading condition", "price", "start of delivery", "end of delivery", "lower limit of heat amount", and "upper limit of heat amount". The major item "deal matching information" includes sub-items of "profit/loss", "vessel" and "number of navigation days".

Here, the display control unit 17 generates each record of the matching table 71, for each combination (pair) of the seller and the buyer determined by the transition sequence determination unit 16, based on the corresponding seller information 41 and buyer information 42. For example, the display control unit 17 displays the seller ID indicated by the seller identification information included in the corresponding seller information 41 in the item "seller ID". Further, the display control unit 17 displays, in the item "trading condition", the information (herein, information indicating whether the delivery location is the port of loading or the port of discharge) indicative of the delivery location indicated by the delivery location information included in the seller information 41, and displays, in the item "price", the price indicated by the price information included in the seller information 41. Further, the display control unit 17 displays, in the items "start of delivery" and "end of delivery", the start and end of the delivery period indicated by the delivery period information included in the seller information 41, respectively. Further, the display control unit 17 displays, in the items "lower limit of heat amount" and "upper limit of heat amount", the lower limit and the upper limit of the trading volume indicated by the trading volume information included in the seller information 41, respectively. The display control unit 17 displays the buyer ID indicated by the buyer identification information included in the corresponding buyer information 42 in the item "buyer ID". Further, the display control unit 17 displays, in the item "trading condition", the information (herein, information indicating whether the delivery location is the port of loading or the port of discharge) indicative of the delivery location indicated by the delivery location information included in the buyer information 42, and is displays, in the item "price", the price indicated by the price information included in the buyer information 42. Further, the display control unit 17 displays, in the items "start of delivery" and "end of delivery", the start and end of the delivery period indicated by the delivery period information included in the buyer information 42, respectively. Further, the display control unit 17 displays, in the items "lower limit of heat amount" and "upper limit of heat amount", the lower limit and the upper limit of the trading volume indicated by the trading volume information included in the buyer information 42, respectively.

Further, in addition to the information regarding the combination of the sellers and the buyers, the display control unit 17 displays, in the item "deal matching information" with respect to each record in the matching table 71, the profit/loss and allocated vessels for the corresponding transactions. Specifically, the display control unit 17 displays, in the item of "profit/loss", the profit or loss calculated by the transition sequence determination unit 16 for each transaction (i.e., a combination of the seller and the buyer). Further, on the basis of the vessel name information included in the vessel information 43, the display control unit 17 displays, in the item "vessel", the identification information of the vessel allocated for each transaction by the transition sequence determination unit 16. Further, the display control unit 17 displays, in the item "number of navigation days", the number of navigation days that the second candidate determination unit 16 has determined for each transaction.

Thus, according to the matching detail screen image shown in FIG. 16, the display control unit 17 can suitably present detailed information corresponding to any plan selected by the user.

(4-4) Processing Flow

Figure 17:
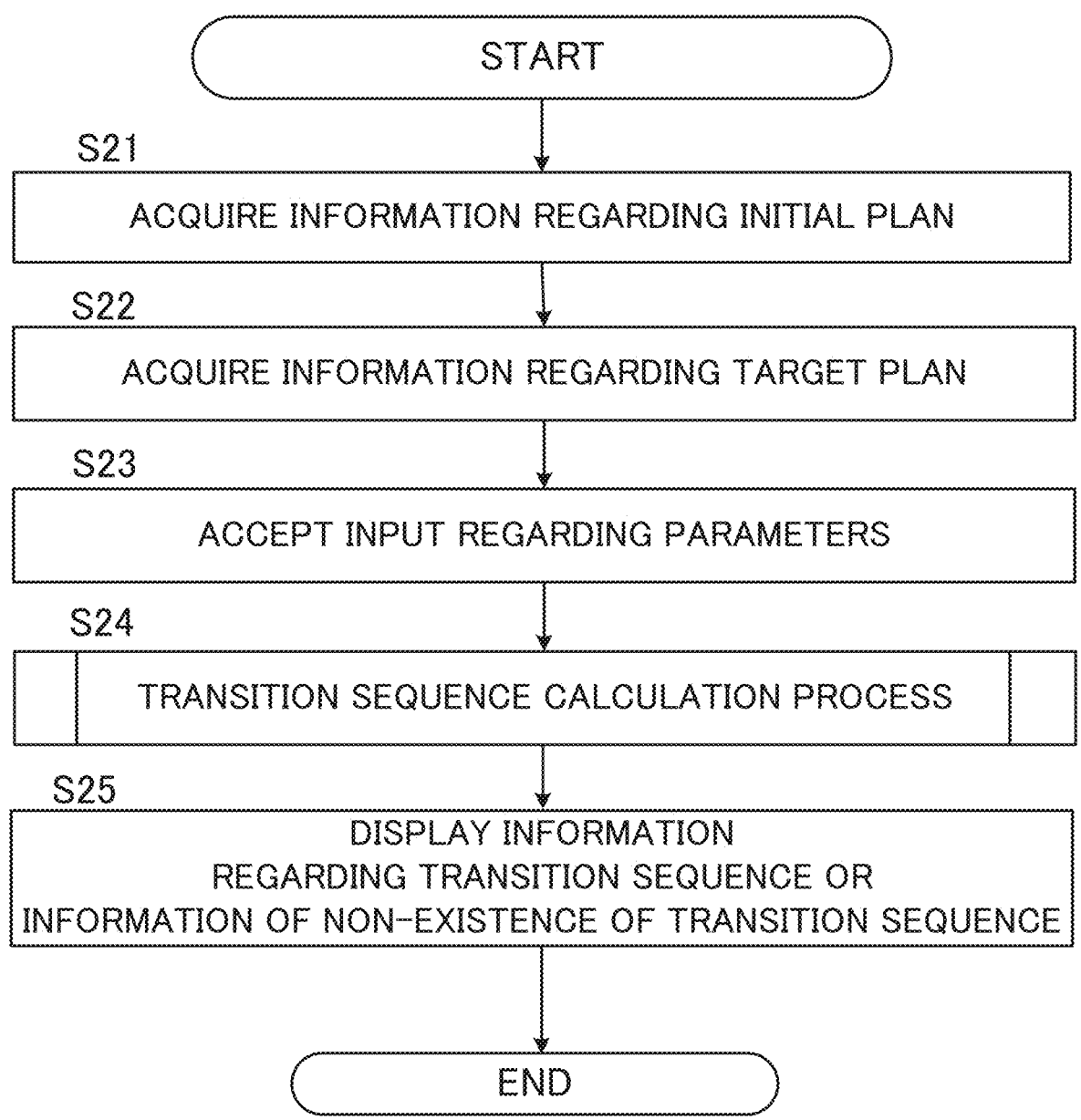
FIG. 17 is an example of a flowchart showing a processing procedure performed by the information processing device in the first example embodiment.

FIG. 17 is an example of a flowchart illustrating a processing procedure that is executed by the information processing device 1 according to the first example embodiment.

First, the information processing device 1 acquires information regarding the initial plan (step S21). Further, the information processing device 1 acquires information regarding the target plan (step S22). For example, as described in the description of the user instruction screen image, the information processing device 1 specifies the initial plan and the target plan based on the user input or the like and acquires the information thereof from the plan information 45 or the like. Furthermore, the information processing device 1 receives the user input (external input) relating to the parameters required for the transition sequence calculation process such as the profit threshold value θ (step S23).

Then, the information processing device 1 executes the transition sequence calculation process (step S24). Specifically, the transition sequence determination unit 16 executes the flowchart shown in FIG. 12 on the basis of the solution x based on the information regarding the initial plan acquired at step S21, the solution y based on the information regarding the target plan is acquired at step S22, and the information regarding the basic operation and the function h stored in the memory 12 or the like. Thus, the transition sequence determination unit 16 outputs information indicating that there is no profit guaranteed transition sequence or a profit guaranteed transition sequence that satisfies the conditions.

Then, the information processing device 1 generates the display information S2 relating to the profit guaranteed transition sequence, or the display information S2 indicates that there is no profit guaranteed transition sequence, and causes the display device 3 on the basis of the display information S2 to display information regarding the profit guaranteed transition sequence or information that there is no profit guaranteed transition sequence (step S25).

(5) Modifications

Next, a description will be given of a preferred modifications to the first example embodiment. The following modifications may be applied to the first example embodiment in any combination.

(First Modification)

The terms of transaction of the initial plan are not necessarily the same as the terms of transaction of the target plan, and the terms of transaction of the target plan may be relaxed from the terms of transaction of the initial plan.

Examples of such situations include a case where a target plan is newly determined because a buying and selling pair becomes possible to make which was not possible at the initial plan and a case where a target plan is determined on the assumption that a buying and selling pair is possible to make which is not actually possible at the moment.

If the terms of transaction of the target plan is relaxed from the terms of transaction of the initial plan, "y∈R", "x∈R'", and "x∈R" are always true although "y∈R'" is not always true, wherein "R'" denotes a set of solutions that satisfy the terms of transaction at the time of the initial plan and "R" denotes a set of solutions that satisfy the terms of transaction of the target plan. Similarly, provided that "f" denotes a function configured to calculate the profit based on the terms of transaction at the time of formulating the initial plan and "f'" denotes a function configured to calculate the profit based on the terms of transaction of the target plan, it is always possible to calculate the function f (y), the function f (x), and the function f' (x) although it is not always possible to calculate the function f' (y). Thus, the solution x is one of the solutions in the optimization problem of the target plan.

As described above, when the terms of transaction of the target plan is relaxed from the terms of transaction of the initial plan, the initial plan surely satisfies the terms of transaction assumed in the formulation of the target plan. Therefore, the profit guaranteed transition sequence is suitably calculated by the transition sequence calculation process shown in FIG. 12.

(Second Modification)

The information processing device 1 may change the solution x corresponding to the initial plan based on the user input in accordance with the negotiation result and repeatedly execute the transition sequence calculation process.

Figure 18A:
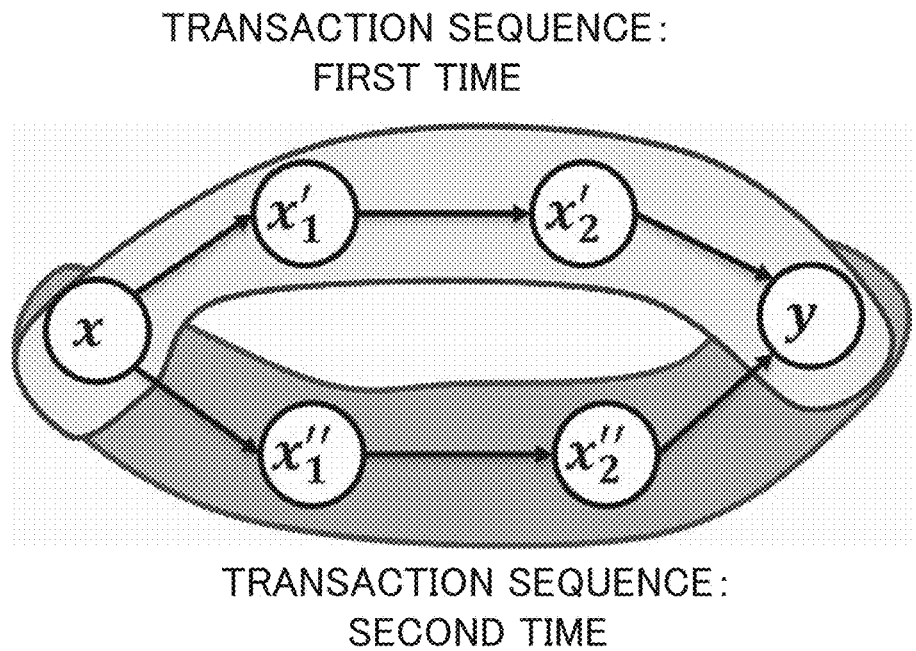
FIG. 18A illustrates a profit guaranteed transition sequence calculated in the first time and a profit guaranteed transition sequence calculated in the second time, in the case of calculating the profit guaranteed transition sequence by changing the solutions corresponding to the initial plan.

FIG. 18A is a diagram illustrating a profit guaranteed transition sequence calculated for the first time and a profit guaranteed transition sequence calculated for the second time, respectively, when the solution x corresponding to the initial plan is changed to calculate the profit guaranteed transition sequences. In this case, in the first transition sequence calculation process, the information processing device 1 calculates the profit guaranteed transition sequence $\{x, x_1', x_2', y\}$ based on the combination of the solution x corresponding to the initial plan and the solution y corresponding to the target plan. Thereafter, the user's negotiation fails and transitions to a condition corresponding to the solution "$x_1''$" that is not included in the above-mentioned profit guaranteed transition. In this case, the information processing device 1 recognizes the solution $x_1''$ corresponding to the state after the negotiation failure based on the input information S1 by the input device 2, and uses this solution as the solution equivalent to the initial plan. Then, the information processing device 1 calculates the profit guaranteed transition sequence $\{x_1'', x_2'', y\}$ by executing the transition sequence calculation process based on the combination of the solution $x_1''$ and the solution y corresponding to the target plan.

As such, the information processing device 1 executes the transition sequence calculation process using the plan specified in accordance with the negotiation result as the initial plan, and suitably presents the profit guaranteed transition sequence corresponding to the current state to the user.

(Third Modification)

Instead of determining the profit guaranteed transition sequence at once, the information processing device 1 may let the user select a transition state from the profit guaranteed transition sequences obtained by performing the transition sequence calculation process based on the plurality of profit threshold values θ, and then lets the user further select the subsequent transition state based on the selected transition state.

Figure 18B:
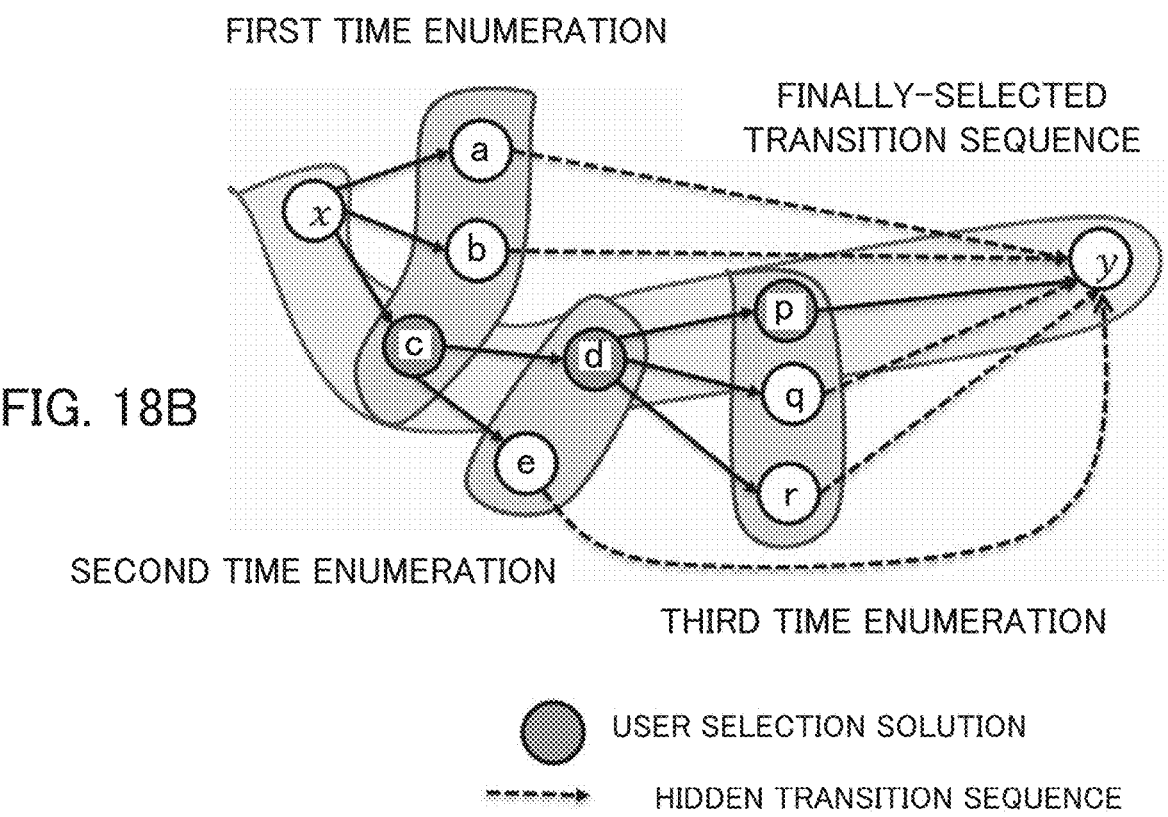
FIG. 18B illustrates a transition state from the solution corresponding to the initial plan to the solution corresponding to the target plan.

FIG. 18B is a diagram illustrating transition states from the solution x corresponding to the initial plan to the solution y corresponding to the target plan in the third modification. First, the transition sequence determination unit 16 calculates a plurality of profit guaranteed transition sequences based on the solution y corresponding to the target plan from the solution x corresponding to the initial plan. In this case, the transition sequence determination unit 16, calculates a plurality of profit guaranteed transition sequences by setting a predetermined number of profit threshold values θ. Then, the display control unit 17 extracts solutions (here, a, b, and c) after applying one basic operation (after one step) to the solution x, from a plurality of profit guaranteed transition sequences calculated by the transition sequence determination unit 16, and enumerates and displays them in a selectable manner (i.e., performs first enumeration). Then, the display control unit 17 receives an input from the user for selecting any one solution from the enumerated solutions. In this case, the display control unit 17 may exclude the solution of a profit guaranteed transition sequence having the number of elements larger than a threshold value from the enumerated solution.

Then, the transition sequence determination unit 16 uses a solution (c in this case), which is selected by the user among the solutions enumerated in the first enumeration, as the solution corresponding to the initial plan, and generates a plurality of profit guaranteed transition sequences by setting a plurality of profit threshold values θ through transition sequence calculation process. Then, the display control unit 17 extracts solutions (d and e in this case) after applying one basic operation (after one step) to the solution c, from a plurality of profit guaranteed transition sequences calculated by the transition sequence determination unit 16 and enumerates and displays them in a selectable manner (i.e., performs second enumeration). Then, the display control unit 17 receives an input from the user for selecting any one solution (in this case, the solution d) from the enumerated solutions. Similarly, the transition sequence determination unit 16 performs transition sequence calculation process by using the solution d as the solution in the initial plan, and the display control unit 17 enumerates and displays the next solutions (in this case, p, q, r) of the solution d in a selectable manner (i.e., perform third time enumeration). Then, the transition sequence determination unit 16 determines the final profit guaranteed transition sequence $\{x, c, d, p, y\}$.

In this way, the information processing device 1 repeats the transition sequence calculation process, the enumeration of the solutions, and the selection of the solution based on the user input until the solution y is obtained. This allows the user to determine a transition sequence from solution x to the solution y while assuming various negotiations. The transition sequence determination unit 16 may enumerate solutions reachable by a predetermined number of basic operations, instead of enumerating solutions reachable by one basic operation.

(Fourth Modification)

The information processing device 1 determined the transportation schedule on the assumption that a vessel is used as a transportation (transport means). Alternatively, the information processing device 1 may determine the transport schedule of the transaction target by means of transportation other than vessels (such as airplanes) or a combination of vessels with the other transportation. In this case, the storage device 4 stores, in addition to or in place of the vessel information 43 and port information 44, information on other transportations that can be is used, information on ports (airports) used by other transportations, and the like.

(Fifth Modification)

The information processing device 1 may not execute the determination process of the transport schedule based on the vessel information 43 and the port information 44. In this case, the optimization processing unit 16 determines the combination of the sellers and the buyers in the optimization process based on the seller information 41 and the buyer information 42 without referring to the vessel information 43 and the port information 44, respectively.

Second Example Embodiment

Figure 19:
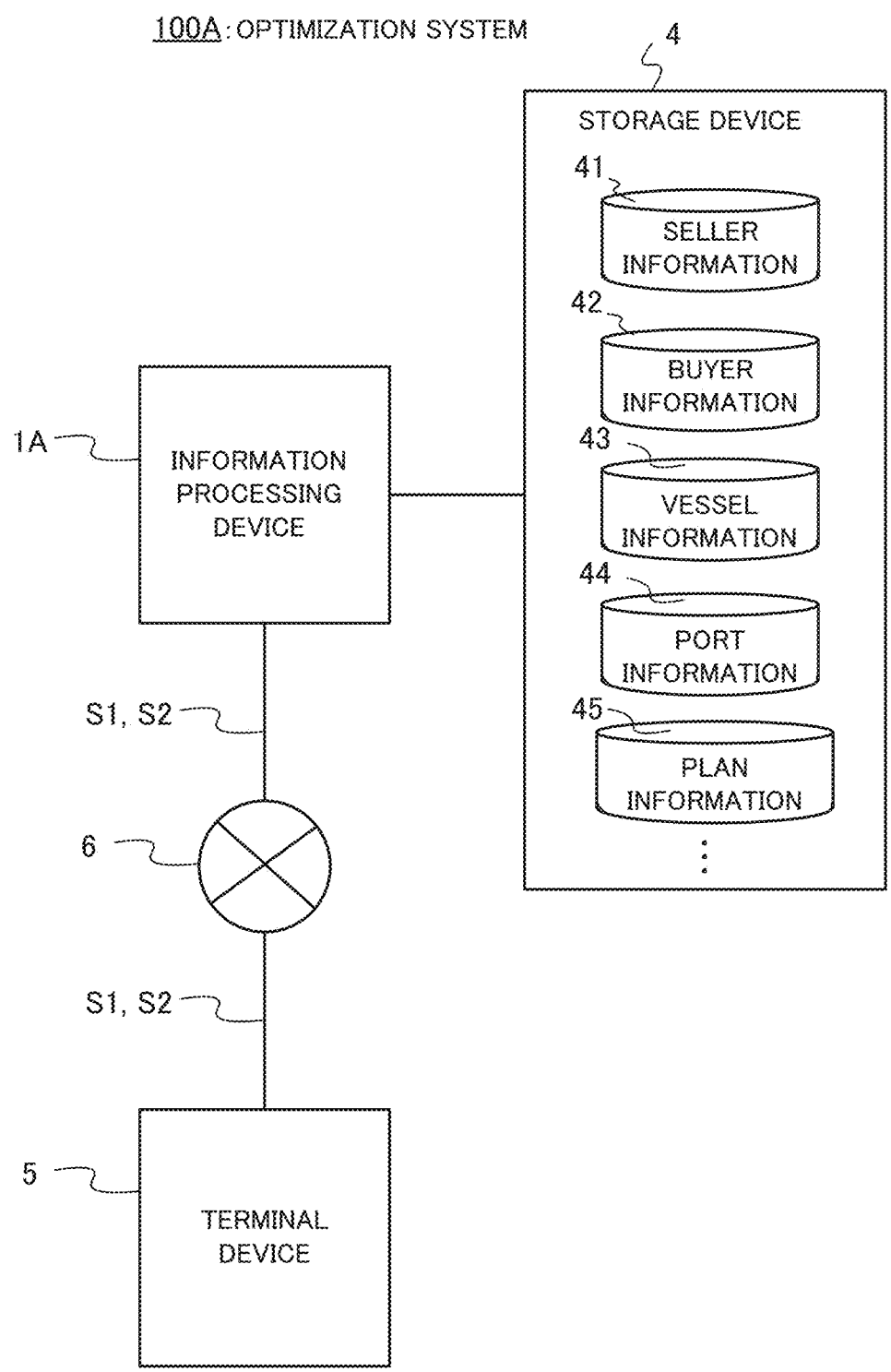
FIG. 19 illustrates a configuration of an optimization system in the second example embodiment.

FIG. 19 shows a configuration of an optimization system 100A in the second example embodiment. As shown in FIG. 19, the optimization system 100A mainly includes an information processing device 1A, a storage device 4, and a terminal device 5. The information processing device 1A and the terminal device 5 perform data communication via the network 6 with each other.

The information processing device 1A has the same configuration as the information processing device 1 according to the first example embodiment and executes the same optimization process as the optimization process executed by the information processing device 1. In this case, the information processing device 1A receives the input information S1 from the terminal device 5 via the network 6 while the information processing device 1 in the first example embodiment receives the input information S1 from the input device 2. Further, the information processing device 1A transmits the display information S2 to the terminal device 5 via the network 6 while the information processing device 1 in the first example embodiment transmits the display information S2 to the display device 3. Accordingly, the information processing device 1A according to the second example embodiment functions as a server device.

The terminal device 5 is a terminal equipped with an input function, a display function, and a communication function, and functions as the input device 2 and the display device 3 in the first example embodiment. Examples of the terminal device 5 include a personal computer, a tablet-type terminal, and a PDA (Personal Digital Assistant). The terminal device 5 transmits the input information S1 generated based on the received user input to the information processing device 1A through the network 6. When receiving the display information S2 from the information processing device 1A, the terminal device 5 displays each kind of screen images based on the display information S2.

The information processing device 1A according to the second example embodiment executes a transition sequence determination process or the like on the basis of a request from the user of the terminal device 5, and suitably presents to the user the contents to be displayed on the display device 3 in the first example embodiment.

Third Example Embodiment

Figure 20:
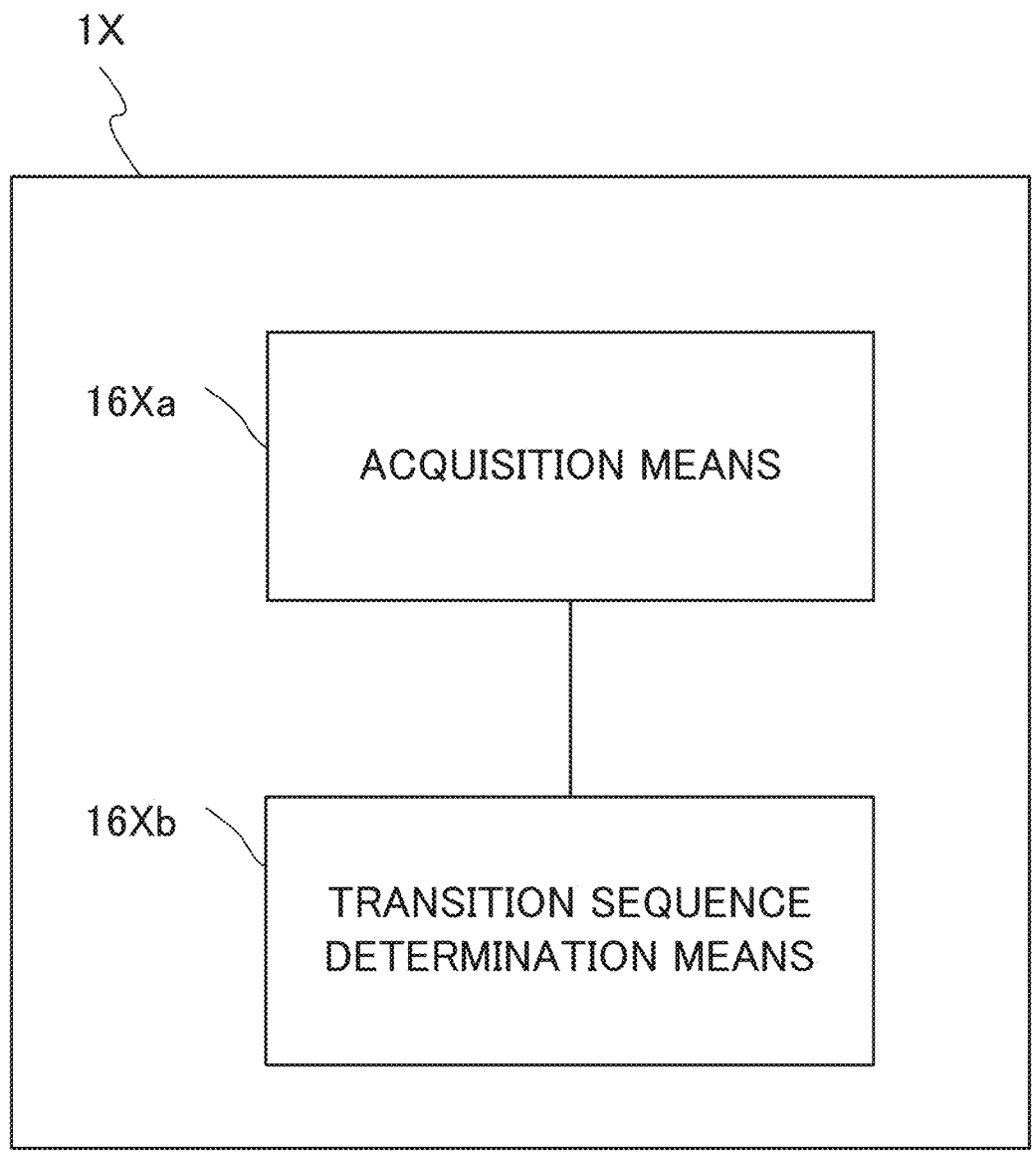
FIG. 20 illustrates a functional block diagram of an information processing device according to a third example embodiment.

FIG. 20 is a functional block diagram of an information processing device 1X according to a third example embodiment. The information processing device 1X mainly includes an acquisition means 16Xa and a transition sequence determination means 16Xb. The information processing device 1X may be configured by a plurality of devices.

The acquisition means 16Xa is configured to acquire a first combination between sellers and buyers conducting transactions and a second combination between the sellers and the buyers differing from the first combination. For example, "the first combination" is the solution x corresponding to the initial plan in the first example embodiment or the second example embodiment, and the "second combination" is a solution y corresponding to the target plan in the first example embodiment or the second example embodiment.

The transition sequence determination means 16Xb is configured to determine a transition sequence of combinations between the sellers and the buyers, the transition sequence being generated in a process of making a transition, per basic operation for changing the combinations between the sellers and the buyers, from the first combination to the second combination, each combination of the transition sequence making a profit of a mediator equal to or larger than a threshold value, the mediator mediating the transactions. The "transition sequence" is a profit guaranteed transition sequence in the first or second example embodiment. Examples of the acquisition means 16Xa and the transition sequence determination means 16Xb include the transition sequence determination unit 16 according to the first example embodiment or the second example embodiment.

FIG. 21 is an exemplary flowchart that is executed by the information processing device 1X in the third example embodiment. First, the acquisition means 16Xa acquires a first combination between sellers and buyers conducting transactions and a second combination between the sellers and the buyers differing from the first combination (step S31). The transition sequence determination means 16Xb determines a transition sequence of combinations between the sellers and the buyers, the transition sequence being generated in a process of making a transition, per basic operation for changing the combinations between the sellers and the buyers, from the first combination to the second combination, each combination of the transition sequence making a profit of a mediator equal to or larger than a threshold value, the mediator mediating the transactions (step S32).

The information processing device 1X according to the third example embodiment can derive the stepwise transition conditions in accurate consideration of the profit of the mediator when making a transition from the first combination to the second combination.

In the example embodiments described above, the program is stored by any type of a non-transitory computer-readable medium (non-transitory computer readable medium) and can be supplied to a processor or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1A, 1X Information processing device
2 Input device
3 Display device
4 Storage device
5 Terminal device
100, 100A Optimization system

What is claimed is:

1. An information processing device comprising:
at least one memory configured to store instructions; and
at least one processor configured to execute the instructions to:
acquire a first combination between sellers and buyers conducting transactions and a second combination between the sellers and the buyers differing from the first combination; and
determine a transition sequence of combinations between the sellers and the buyers,
the transition sequence being generated in a process of making a transition, per basic operation for changing the combinations between the sellers and the buyers, from the first combination to the second combination,
each combination of the transition sequence making a profit of a mediator equal to or larger than a threshold value,
the mediator mediating the transactions.

2. The information processing device according to claim 1,
wherein the profit for the second combination is equal to or larger than the profit for the first combination, and
wherein the at least one processor is configured to execute the instructions to set the threshold value based on the profit for the first combination.

3. The information processing device according to claim 1,
wherein the at least one processor is configured to execute the instructions to set multiple threshold values and determine the transition sequence for each of the multiple threshold values.

4. The information processing device according to claim 1,
wherein the basic operation is at least one of
an operation of switching buyers paired with a first seller and a second seller of the sellers, or
an operation of addition or dissolution of a pair of a first seller of the sellers and a first buyer of the buyers.

5. The information processing device according to claim 1,
wherein the at least one processor is configured to further execute the instructions to display information regarding the transition sequence.

6. The information processing device according to claim 5,
wherein the at least one processor is configured to execute the instructions, if the transition sequence exists, to display information regarding each combination included in the transition sequence arranged in order of the number of times the basic operation is applied.

7. The information processing device according to claim 5,
wherein the at least one processor is configured to execute the instructions, if the transition sequence does not exist, to display information indicative of non-existence of the transition sequence.

8. The information processing device according to claim 5,
wherein the at least one processor is configured to execute the instructions to extract and enumerate, from the transition sequences, combinations obtained by applying a predetermined number of the basic operations to the first combination, and
wherein the at least one processor is configured to execute the instructions to determine the transaction sequence on an assumption that a combination selected from the enumerated combinations is used as the first combination.

9. A control method executed by a computer, the control method comprising:
acquiring a first combination between sellers and buyers conducting transactions and a second combination between the sellers and the buyers differing from the first combination; and
determining a transition sequence of combinations between the sellers and the buyers,
the transition sequence being generated in a process of making a transition, per basic operation for changing the combinations between the sellers and the buyers, from the first combination to the second combination,
each combination of the transition sequence making a profit of a mediator equal to or larger than a threshold value,
the mediator mediating the transactions.

10. A non-transitory computer readable storage medium storing a program executed by a computer, the program causing the computer to:
acquire a first combination between sellers and buyers conducting transactions and a second combination between the sellers and the buyers differing from the first combination; and
determine a transition sequence of combinations between the sellers and the buyers,
the transition sequence being generated in a process of making a transition, per basic operation for changing the combinations between the sellers and the buyers, from the first combination to the second combination,
each combination of the transition sequence making a profit of a mediator equal to or larger than a threshold value,
the mediator mediating the transactions.

* * * * *